(12) United States Patent
Moriya et al.

(10) Patent No.: US 9,973,753 B2
(45) Date of Patent: May 15, 2018

(54) MOVING IMAGE ENCODING DEVICE AND MOVING IMAGE DECODING DEVICE BASED ON ADAPTIVE SWITCHING AMONG TRANSFORMATION BLOCK SIZES

(71) Applicant: MITSUBISHI ELECTRIC CORPORATION, Tokyo (JP)

(72) Inventors: Yoshimi Moriya, Tokyo (JP); Shunichi Sekiguchi, Tokyo (JP); Kazuo Sugimoto, Tokyo (JP); Kohtaro Asai, Tokyo (JP); Tokumichi Murakami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days. days.

(21) Appl. No.: 15/443,431

(22) Filed: Feb. 27, 2017

(65) Prior Publication Data

US 2017/0171543 A1  Jun. 15, 2017

Related U.S. Application Data

(63) Continuation of application No. 13/639,134, filed as application No. PCT/JP2011/001953 on Mar. 31, 2011.

(30) Foreign Application Priority Data

Apr. 9, 2010  (JP) ................. 2010-090534

(51) Int. Cl.
*H04N 19/107* (2014.01)
*H04N 19/176* (2014.01)
(Continued)

(52) U.S. Cl.
CPC .......... *H04N 19/107* (2014.11); *H04N 19/13* (2014.11); *H04N 19/176* (2014.11); *H04N 19/91* (2014.11)

(58) Field of Classification Search
CPC .... H04N 19/107; H04N 19/13; H04N 19/176; H04N 19/91
See application file for complete search history.

(56) References Cited

U.S. PATENT DOCUMENTS

| 5,107,345 A | 4/1992 | Lee |
| 6,600,836 B1 | 7/2003 | Thyagarajan et al. |

(Continued)

FOREIGN PATENT DOCUMENTS

| EP | 1 445 956 A1 | 8/2004 |
| EP | 1 909 508 A1 | 4/2008 |

(Continued)

OTHER PUBLICATIONS

Office Action dated Feb. 27, 2017 in corresponding Korean Patent Application No. 2017-7001857 with an English Translation.

(Continued)

*Primary Examiner* — Thai Tran
*Assistant Examiner* — Christopher T Braniff
(74) *Attorney, Agent, or Firm* — Birch, Stewart, Kolasch & Birch, LLP

(57) ABSTRACT

An encoding controlling unit 3 selects one transformation block size which provides an optimal degree of encoding efficiency from a set of transformation block sizes which are determined in accordance with an encoding mode 7, and includes the transformation block size selected thereby in optimal compression parameters 20*a* to notify the transformation block size to a transformation/quantization unit 19, and the transformation/quantization unit 19 divides an optimal prediction differential signal 13*a* into blocks having the transformation block size included in the optimal compression parameters 20*a*, and carries out a transformation and quantization process on each of the blocks to generate compressed data 21.

5 Claims, 15 Drawing Sheets

(51) Int. Cl.
  *H04N 19/13* (2014.01)
  *H04N 19/91* (2014.01)

(56) References Cited

U.S. PATENT DOCUMENTS

| | | | |
|---|---|---|---|
| 6,996,283 B2 | 2/2006 | Thyagarajan | |
| 2004/0062309 A1 | 4/2004 | Romanowski et al. | |
| 2004/0126028 A1 | 7/2004 | Adachi et al. | |
| 2006/0159174 A1 | 7/2006 | Chono | |
| 2007/0206679 A1 | 9/2007 | Lim et al. | |
| 2007/0286277 A1* | 12/2007 | Chen | H04N 19/52 375/240.03 |
| 2008/0056375 A1 | 3/2008 | Kondo et al. | |
| 2009/0046781 A1 | 2/2009 | Moriya et al. | |
| 2009/0274213 A1 | 11/2009 | Zhou et al. | |
| 2009/0285285 A1 | 11/2009 | Fujisawa et al. | |
| 2009/0323809 A1 | 12/2009 | Raveendran | |
| 2010/0054615 A1* | 3/2010 | Choi | H03M 7/14 382/233 |
| 2011/0286513 A1 | 11/2011 | Zheng et al. | |
| 2012/0033731 A1 | 2/2012 | Yamamoto et al. | |

FOREIGN PATENT DOCUMENTS

| | | |
|---|---|---|
| JP | 2003-324731 A | 11/2003 |
| JP | 2003-533141 A | 11/2003 |
| JP | 2004-134896 A | 4/2004 |
| JP | 2004-135252 A | 4/2004 |
| JP | 2007-243427 A | 9/2007 |
| JP | 2009-5413 A | 1/2009 |
| JP | 2009-49779 A | 3/2009 |
| JP | 2009-55236 A | 3/2009 |
| JP | 4364919 B2 | 8/2009 |
| JP | 2012-504909 A | 2/2012 |
| JP | 2012-517186 A | 7/2012 |
| TW | 200952499 A1 | 12/2009 |
| TW | 2010082989 A1 | 2/2010 |
| WO | WO2005/062625 A1 | 7/2005 |
| WO | WO 2006/028088 A1 | 3/2006 |
| WO | WO 2007/034918 A1 | 3/2007 |
| WO | WO 2008/123254 A1 | 10/2008 |
| WO | WO 2010/039822 A2 | 4/2010 |
| WO | WO 2010/090629 A1 | 8/2010 |
| WO | WO 2010/116869 A1 | 10/2010 |

OTHER PUBLICATIONS

Office Action dated Feb. 6, 2017 in corresponding Taiwanese Patent Application No. 104143548 with an English Translation.
Freeman et al., "Learning Low-Level Vision", Intenational Journal of Computer Vision, vol. 40, No. 1, 2000, pp. 25-47.
JVT: Output Document New Draft of JVT Codec: Wiegard, T. (2002) "Draft ITU-T Recommendation H.264 (aka H.26L)—Study Group 16, Question 6", Joint Video Team of ISO/IEC MPEG and ITU-T VCEG.
Qi et al. (2006) "Adaptive Block-Size Transform Based on Extended Integer 8×8/4×4 Transforms For H.264/AVC" IEEE (pp. 1341-1344).
Wien, M. (2003) "Variable Block-Size Transforms for H.264/AVC," IEEE Transactions on Circuits & Systems for Video Tech. 13:7:604-613.
Extended European Search Report dated Aug. 26, 2016 in the corresponding European Patent Application No. 16181069.2.
Office Action dated Jan. 31, 2017 in corresponding Japanese Patent Application No. 2016-039080 with an English Translation.
Yamamoto et al., "Analysis on Transform and Partition Selection in Extended Block Sizes and Modification of Block Transforms," ITU—Telecommunications Standardization Sector, Study Group 16 Question 6, VCEG, VCEG-AK19, 37th Meeting, Yokohama, Japan, Apr. 15-18, 2009, pp. 1-5.
Trial Decision issued Mar. 28, 2017 in corresponding Japanese Patent Application No. 2014207401 with an English Translation.
Chinese Office Action dated Oct. 27, 2017 in the corresponding Chinese Application No. 201180018324.2 with an English Translation.

\* cited by examiner

FIG.4
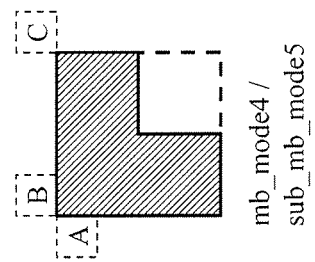
mb_mode4 / sub_mb_mode5
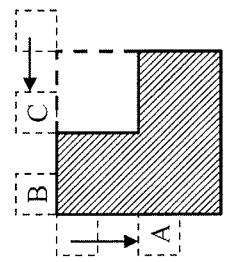
mb_mode3 / sub_mb_mode4
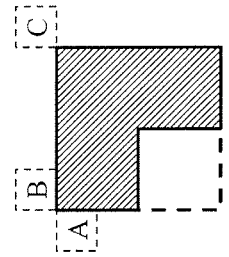
mb_mode2 / sub_mb_mode3
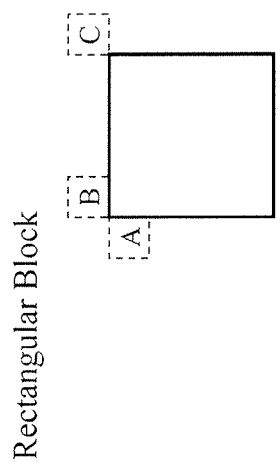
Rectangular Block
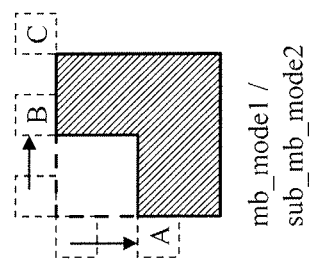
mb_mode1 / sub_mb_mode2
L-Shaped Block

FIG.10

| Encoding Mode | Index | Binary Signal | | |
|---|---|---|---|---|
| | | Bin Number | | |
| | | 0 | 1 | 2 |
| mb_skip | 0 | 1 | | |
| mb_mode0 | 1 | 0 | 0 | 0 |
| mb_mode1 | 2 | 0 | 0 | 1 |
| mb_mode2 | 3 | 0 | 1 | 0 |
| mb_mode3 | 4 | 0 | 1 | 1 |

FIG.11

| Probability Table Number | Probability of Occurrence |
|---|---|
| 0 | 0.500 |
| 1 | 0.527 |
| 2 | 0.550 |
| …… | …… |
| 16 | 0.783 |
| …… | …… |
| 21 | 0.833 |
| 22 | 0.842 |
| …… | …… |
| 62 | 0.981 |

FIG.12

| Probability Table Number | 0 | 1 | … | 21 | … | 62 |
|---|---|---|---|---|---|---|
| Probability Transition after Encoding of LPS | 0 | 0 | … | 16 | … | 38 |
| Probability Transition after Encoding of MPS | 1 | 2 | … | 22 | … | 62 |

FIG.14

| Encoding Mode | Index | Binary Signal | | |
| --- | --- | --- | --- | --- |
| | | Bin Number | | |
| | | 0 | 1 | 2 |
| mb_mode3 | 0 | 1 | | |
| mb_skip | 1 | 0 | 0 | 0 |
| mb_mode0 | 2 | 0 | 0 | 1 |
| mb_mode1 | 3 | 0 | 1 | 0 |
| mb_mode2 | 4 | 0 | 1 | 1 |

MOVING IMAGE ENCODING DEVICE AND MOVING IMAGE DECODING DEVICE BASED ON ADAPTIVE SWITCHING AMONG TRANSFORMATION BLOCK SIZES

This application is a Continuation of copending application Ser. No. 13/639,134 filed on Oct. 18, 2012, which was filed as PCT International Application No. PCT/JP2011/001953 on Mar. 31, 2011, which claims the benefit under 35 U.S.C. § 119(a) to Patent Application No. 2010-090534, filed in Japan on Apr. 9, 2010, all of which are hereby expressly incorporated by reference into the present application.

FIELD OF THE INVENTION

The present invention relates to a moving image encoding device which divides a moving image into predetermined areas and encodes the moving image in units of one area, and a moving image decoding device which decodes an encoded moving image in units of one predetermined area.

BACKGROUND OF THE INVENTION

Conventionally, in an international standard video encoding system, such as MPEG or ITU-T H.26x, a method of defining block data (referred to as "macroblock" from here on) as a unit, the block data being a combination of 16×16 pixels of brightness signal and 8×8 pixels of color difference signal corresponding to the 16×16 pixels of brightness signal, and compressing each frame of a video signal in units of block data in accordance with a motion compensation technique, and an orthogonal transformation/transform coefficient quantization technique is used.

The motion compensation technique is used to reduce the redundancy of a signal in a time direction for each macroblock by using a high correlation existing between video frames. In accordance with this motion compensation technique, an already-encoded frame which has been previously encoded is stored in a memory as a reference image, and a block area which provides the smallest difference in electric power between the block area itself and the current macroblock which is a target block for the motion-compensated prediction is searched for through a search range predetermined in the reference image, and a spatial displacement between the spatial position of the current macroblock and the spatial position of the block area in the reference image which is determined as the result of the search is then encoded as a motion vector.

Further, in accordance with the orthogonal transformation/transform coefficient quantization technique, a differential signal which is acquired by subtracting a prediction signal acquired as the result of the above-mentioned motion-compensated prediction from the current macroblock is orthogonal transformed and quantized so that the amount of information is compressed.

In the case of MPEG-4 Visual, each block which is used as a unit for motion-compensated prediction has a minimum size of 8×8 pixels, and DCT (discrete cosine transform) having a 8×8 pixel size is used also for orthogonal transformation. In contrast with this, in the case of (ITU-T H.264) MPEG-4 AVC (Moving Picture Experts Group-4 Advanced Video Coding), a motion-compensated prediction with a block size smaller than 8×8 pixels is prepared in order to efficiently carry out encoding on even an area, such as a boundary between objects, having a small correlation between pixels in a spatial direction. Further, in the orthogonal transformation, the compression and encoding can be carried out by adaptively switching between 8×8-pixel DCT having integer pixel accuracy and 4×4-pixel DCT having integer pixel accuracy on a per-macroblock basis.

In accordance with such a conventional international standard video image encoding method, particularly when the resolution of the image becomes higher resulting from the macroblock size being fixed, an area which is covered by each macroblock is easily localized because the macroblock size is fixed. As a result, there occurs a case in which a peripheral macroblock is placed in the same encoding mode or the same motion vector is allocated to a peripheral macroblock. In such a case, because the overhead of encoding mode information, motion vector information and so on which are encoded even though the prediction efficiency is not improved increases, the encoding efficiency of the entire encoder is reduced.

To solve such a problem, a device which switches between macroblock sizes in accordance with the resolution or the contents of an image is disclosed (for example, refer to patent reference 1). The moving image encoding device disclosed by patent reference 1 can carry out compression and encoding by switching between selectable orthogonal transformation block sizes or between selectable sets of orthogonal transformation block sizes in accordance with the macroblock size.

RELATED ART DOCUMENT

Patent Reference

Patent reference 1: WO 2007/034918

SUMMARY OF THE INVENTION

Problems to be Solved by the Invention

A problem with the conventional international standard video image encoding methods and the invention disclosed by patent reference 1 is, however, that because transformation cannot be carried out by switching among a plurality of orthogonal transformation block sizes within each macroblock, the encoding efficiency is reduced particularly when an object having a different movement or a different pattern exists in a macroblock.

The present invention is made in order to solve the above-mentioned problem, and it is therefore an object of the present invention to provide a moving image encoding device which can carry out compression and encoding by adaptively switching among orthogonal transformation block sizes for each area which is a unit for motion-compensated prediction in each macroblock, and a moving image decoding device.

Means for Solving the Problem

In accordance with the present invention, there is provided a moving image encoding device including: a block dividing unit for dividing an inputted image into macroblock images of two or more blocks each having a predetermined size and dividing each of the macroblock images into a block image of one or more blocks according to an encoding mode to output the block image; an intra-prediction unit for, when the block image is inputted thereto, carrying out an intra-frame prediction on the block image by using an image signal in a frame to generate a prediction image; a motion-compensated prediction unit for, when the block image is inputted thereto, carrying out an image motion-compensated prediction on the block by using one or more frames of reference images to generate a prediction image; a transformation/quantization unit for carrying out a transformation and quantization process on a prediction difference signal which is generated by subtracting the prediction image outputted from either one of the intra-prediction unit and the motion-compensated prediction unit from the block image outputted from the block dividing unit to generate compressed data; a variable length encoding unit for entropy-encoding the compressed data to multiplex the compressed data entropy-encoded thereby into a bitstream; and an encoding controlling unit for selecting a certain transformation block size from a set of transformation block sizes predetermined for a block image to notify the transformation block size selected thereby to a transformation/quantization unit, in which the transformation/quantization unit divides a prediction difference signal into blocks having the transformation block size notified thereto from the encoding controlling unit, and carries out a transformation and quantization process on each of the blocks to generate compressed data.

In accordance with the present invention, there is provided a moving image decoding device including: a variable length decoding unit for receiving a bitstream inputted thereto and compression-encoded in units of each of macroblocks having a predetermined size into which an image is divided and then entropy-decoding an encoding mode in units of one of said macroblocks from said bitstream, and for entropy-decoding prediction parameters, information indicating a transformation block size, and compressed data in units of one of the macroblocks into which the image is divided according to said decoded encoding mode; an intra-prediction unit for, when said prediction parameters are inputted thereto, generating a prediction image by using an intra prediction mode and a decoded image signal in a frame which are included in the prediction parameters; a motion-compensated prediction unit for, when said prediction parameters are inputted thereto, carrying out a motion-compensated prediction by using a motion vector included in the prediction parameters and a reference image specified by a reference image index included in the prediction parameters to generate a prediction image; an inverse quantization/inverse transformation unit for carrying out an inverse quantization and inverse transformation process on said compressed data by using said information indicating the transformation block size to generate a decoded prediction difference signal; and an adding unit for adding the prediction image outputted from either one of the said intra-prediction unit and said motion-compensated prediction unit to said decoded prediction difference signal to output a decoded image signal, in which the inverse quantization/inverse transformation unit determines a transformation block size on the basis of the decoded information indicating the transformation block size and carries out an inverse transformation and inverse quantization process on the compressed data in units of one block having the transformation block size.

ADVANTAGES OF THE INVENTION

Because the moving image encoding device in accordance with the present invention includes: the block dividing unit for dividing an inputted image into macroblock images of two or more blocks each having the predetermined size and dividing each of the macroblock images into a block image of one or more blocks according to an encoding mode to output the block image; the intra-prediction unit for, when the block image is inputted thereto, carrying out an intra-frame prediction on the block image by using an image signal in a frame to generate a prediction image; the motion-compensated prediction unit for, when the block image is inputted thereto, carrying out an image motion-compensated prediction on the block by using one or more frames of reference images to generate a prediction image; the transformation/quantization unit for carrying out a transformation and quantization process on a prediction difference signal which is generated by subtracting the prediction image outputted from either one of the intra-prediction unit and the motion-compensated prediction unit from the block image outputted from the block dividing unit to generate compressed data; the variable length encoding unit for entropy-encoding the compressed data to multiplex the compressed data entropy-encoded thereby into a bitstream; and the encoding controlling unit for notifying a certain transformation block size among a set of transformation block sizes which are predetermined for a block image, in which the transformation/quantization unit divides the prediction difference signal into blocks having the transformation block size and carries out transformation and quantization process on each of the blocks to generate compressed data, a moving image encoding device and a moving image decoding device which can carry out compression and encoding by adaptively switching among the transformation block sizes for each area which is a unit for motion-compensated prediction in each macroblock can be provided.

BRIEF DESCRIPTION OF THE FIGURES

FIG. 4 is a view explaining a determining method of determining a predicted value of a motion vector in accordance with an encoding mode;

FIG. 10 is a view showing an example of a binarization table in a state in which the binarization table is yet to be updated;

FIG. 11 is a view showing an example of a probability table;

FIG. 12 is a view showing an example of a state transition table;

FIG. 13(a) is a view showing the binarization table in binary tree representation, and FIG. 13(b) is a view showing a positional relationship between a macroblock to be encoded and peripheral blocks;

FIG. 14 is a view showing an example of the binarization table in a state in which the binarization table has been updated;

EMBODIMENTS OF THE INVENTION

Hereafter, the preferred embodiments of the present invention will be explained in detail with reference to the drawings.

Embodiment 1.

In this Embodiment 1, a moving image encoding device which carries out a motion-compensated prediction between adjacent frames by using each frame image of a video image as an input and carries out a compression process using orthogonal transformation and quantization on an acquired prediction difference signal, and, after that, carries out variable length encoding to generate a bitstream, and an moving image decoding device which decodes the bitstream will be explained.

Figure 1:
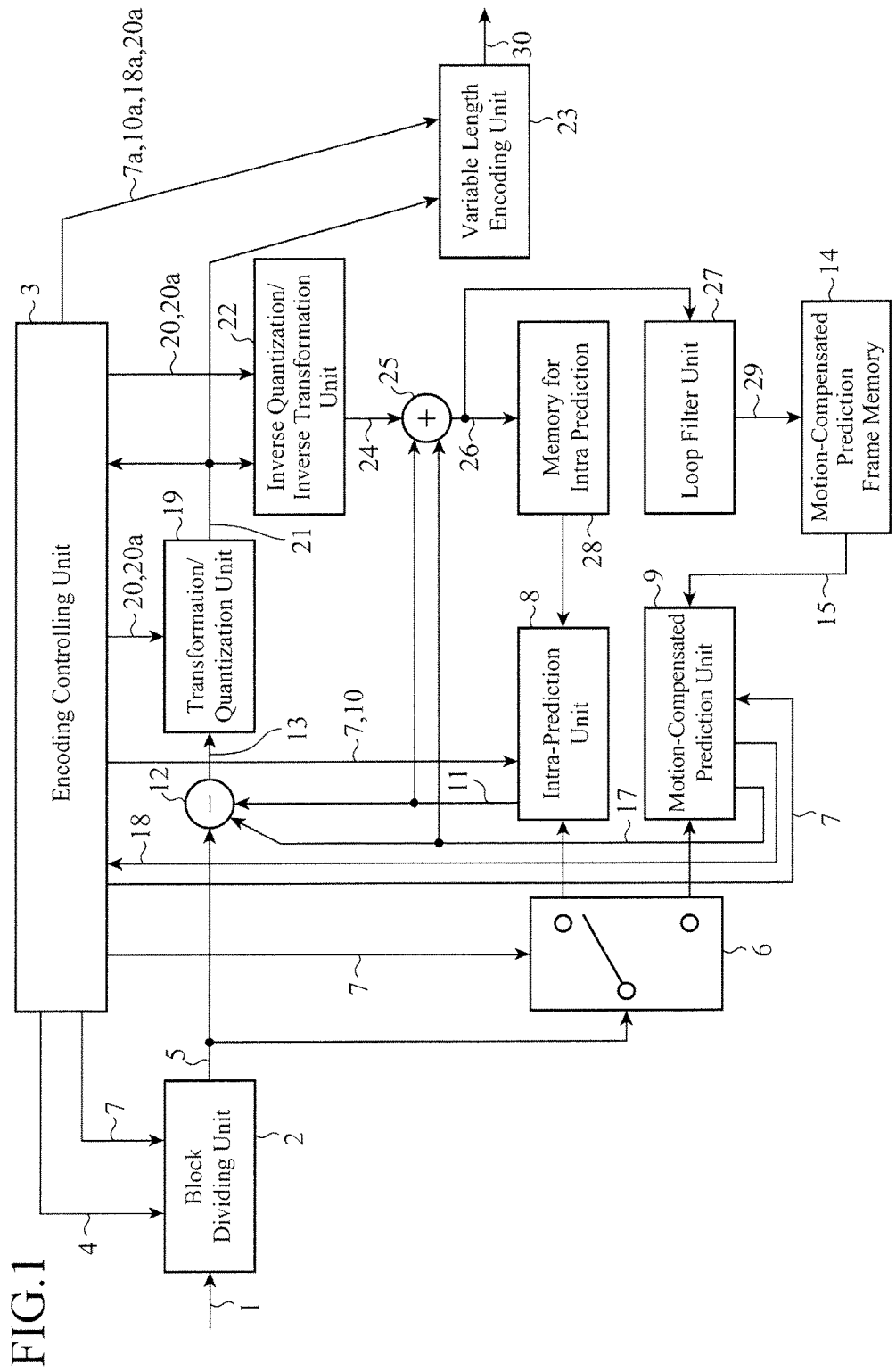
FIG. 1 is a block diagram showing the structure of a moving image encoding device in accordance with Embodiment 1 of the present invention.

FIG. 1 is a block diagram showing the structure of a moving image encoding device in accordance with Embodiment 1 of the present invention. The moving image encoding device shown in FIG. 1 includes a block dividing unit 2 for dividing each frame image of an inputted video signal 1 into macroblock images of a plurality of more blocks each having a macroblock size 4 and further dividing each of the macroblock images into a macro/subblock image 5 of one or more subblocks in accordance with an encoding mode 7 to output this macro/subblock image 5, an intra-prediction unit 8 for, when receiving a macro/subblock image 5 inputted thereto, carrying out an intra-frame prediction on the macro/subblock image 5 by using an image signal stored in a memory 28 for intra prediction to generate a prediction image 11, a motion-compensated prediction unit 9 for, when receiving a macro/subblock image 5 inputted thereto, carrying out a motion-compensated prediction on the macro/subblock image 5 by using a reference image 15 stored in a motion-compensated prediction frame memory 14 to generate a prediction image 17, a switching unit 6 for inputting a macro/subblock image 5 to either one of the intra-prediction unit 8 and the motion-compensated prediction unit 9 in accordance with the encoding mode 7, a subtraction unit 12 for subtracting the prediction image 11 or 17 which is outputted from either one of the intra-prediction unit 8 and the motion-compensated prediction unit 9 from the macro/subblock image 5 outputted from the block dividing unit 2 to generate a prediction difference signal 13, a transformation/quantization unit 19 for carrying out a transformation and quantization process on the prediction difference signal 13 to generate compressed data 21, a variable length encoding unit 23 for entropy-encoding the compressed data 21 to multiplex this compressed data into the bitstream 30, an inverse quantization/inverse transformation unit 22 for carrying out an inverse transformation and inverse quantization process on the compressed data 21 to generate a local decoded prediction difference signal 24, an adder unit 25 for adding the prediction image 11 or 17 outputted from either one of the intra-prediction unit 8 and the motion-compensated prediction unit 9 to the output of the inverse quantization/inverse transformation unit 22 to generate a local decoded image signal 26, the memory 28 for intra prediction for storing the local decoded image signal 26, a loop filter unit 27 for carrying out filtering on the local decoded image signal 26 to generate a local decoded image 29, and the motion-compensated prediction frame memory 14 for storing the local decoded image 29.

An encoding controlling unit 3 outputs pieces of information required for the process carried out by each unit (the macroblock size 4, encoding modes 7, an optimum encoding mode 7a, prediction parameters 10, optimum prediction parameters 10a or 18a, compression parameters 20, and optimum compression parameters 20a). Hereafter, the details of the macroblock size 4 and the encoding mode 7 will be explained. The details of the other pieces of information will be mentioned later.

The encoding controlling unit 3 notifies the block dividing unit 2 of the macroblock size 4 of each frame image of the inputted video signal 1, and also notifies the block dividing unit 2 of all selectable encoding modes 7 in accordance with the picture type for each macro block to be encoded. Although the encoding controlling unit 3 can select a certain encoding mode from among a set of encoding modes, this set of encoding modes is arbitrarily set up. For example, the encoding controlling unit can select a certain encoding mode from among a set shown in FIG. 2A or 2B which will be mentioned below.

Figure 2A:
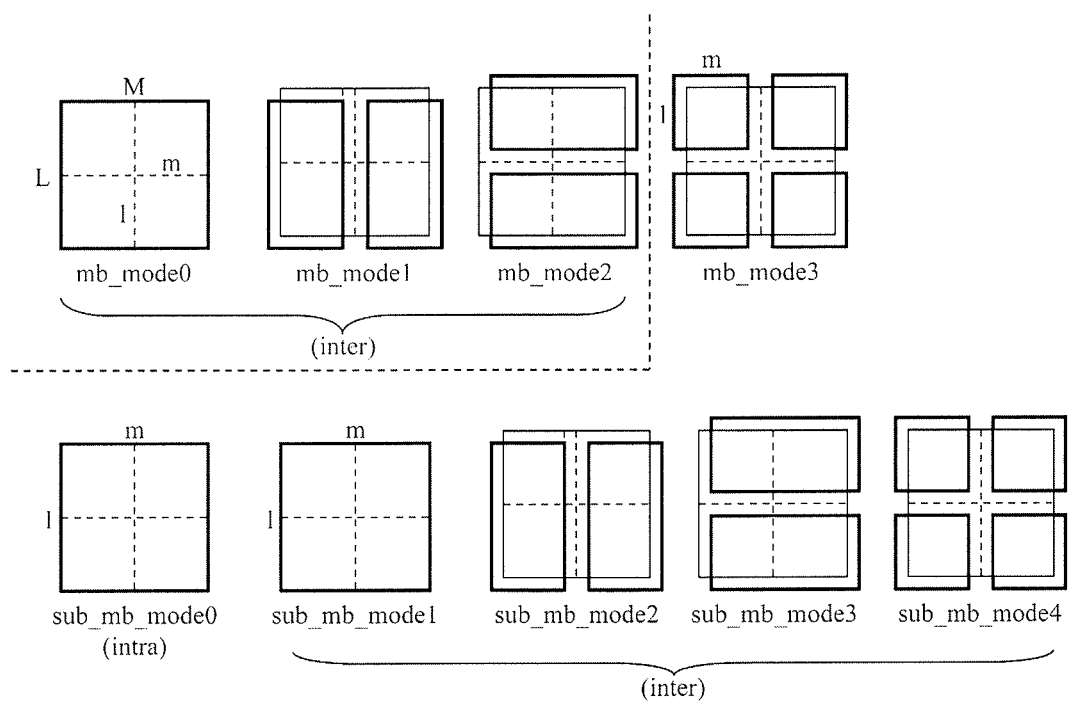
FIG. 2A is a view showing an example of encoding modes for pictures in each of which predictive encoding in a time direction is carried out.

FIG. 2A is a view showing an example of encoding modes for a P (Predictive) picture in each of which predictive encoding in a time direction is carried out. In FIG. 2A, mb_mode0 to mb_mode2 show modes (inter) in each of which a macroblock (M×L pixel block) is encoded by using an inter-frame prediction. mb_mode0 is the mode in which a motion vector is allocated to the whole of a macroblock, mc_mode1 mode1 and mc_mode2 are the modes in each of which a macroblock is divided into equal parts which are aligned horizontally or vertically, and different motion vectors are allocated to the subblocks into which the macroblock is divided, respectively. mc_mode3 is the mode in which a macroblock is divided into four parts, and different encoding modes (sub_mb_mode) are allocated to the four subblocks into which the macroblock is divided, respectively.

sub_mb_mode0 to sub_mb_mode4 are the modes each of which, when mb_mode3 is selected as the encoding mode of a macroblock, can be allocated to each of the four subblocks (m×l pixel blocks) into which the macroblock is divided. sub_mb_mode0 is the mode (intra) in which a subblock is encoded by using an intra-frame prediction. The other modes are the modes (inter) which a subblock is encoded by using an inter-frame prediction. sub_mb_mode 1 is the mode in which one motion vector is allocated to the whole of a subblock, sub_mc_mode2 and sub_mc_mode3 are the modes in each of which a subblock is divided into equal parts which are aligned horizontally or vertically, and different motion vectors are allocated to the subblocks into which the subblock is divided, respectively, and sub_mb_ mode4 is the mode in which a subblock is divided into four parts, and different motion vectors are allocated to the four subblocks into which the subblock is divided, respectively.

Figure 2B:
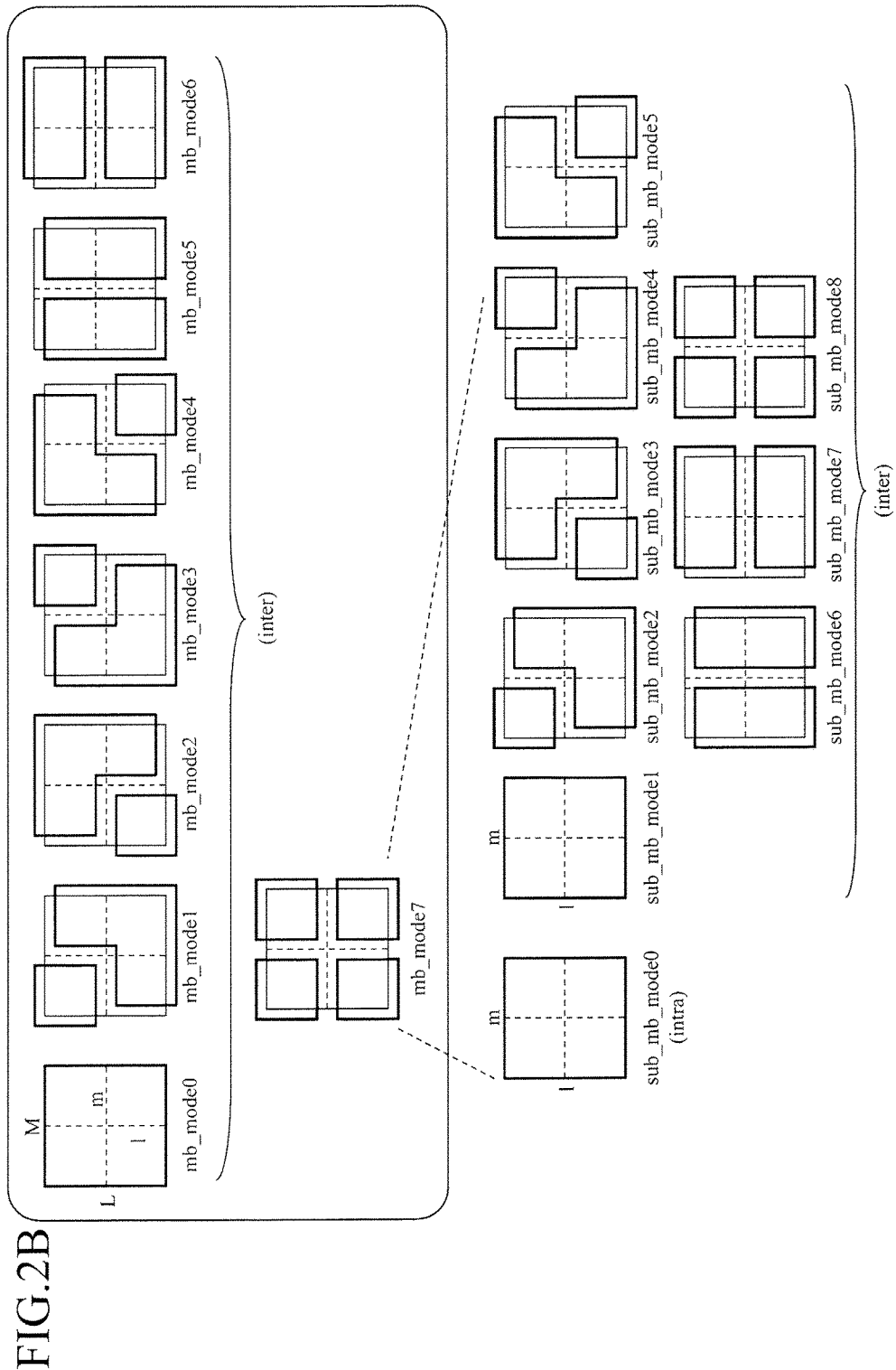
FIG. 2B is a view showing another example of the encoding modes for pictures in each of which predictive encoding in a time direction is carried out.

Further, FIG. 2B is a view showing another example of encoding modes for a P picture in each of which predictive encoding in a time direction is carried out. In FIG. 2B, mb_mode 0 to 6 are the modes (inter) in each of which a macroblock (M×L pixel block) is encoded by using an inter frame prediction. mb_mode0 is the mode in which one motion vector is allocated to the whole of a macroblock, and mb_mode1 to mb_mode6 are the modes in each of which a macroblock is divided into two parts which are aligned horizontally, vertically or diagonally, and different motion vectors are allocated to the two subblocks into which the macroblock is divided, respectively. mb_mode7 is the mode in which a macroblock is divided into four parts, and different encoding modes (sub_mb_mode) are allocated to the four subblocks into which the macroblock is divided, respectively.

sub_mb_mode0 to sub_mb_mode8 are the modes each of which, when mb_mode7 is selected as the encoding mode of a macroblock, can be allocated to each of the four subblocks (m×l pixel blocks) into which the macroblock is divided. sub_mb_mode0 is the mode (intra) in which a subblock is encoded by using an intra-frame prediction. The other modes are the modes (inter) which a subblock is encoded by using an inter-frame prediction. sub_mb_mode1 is the mode in which one motion vector is allocated to the whole of a subblock, sub_mb_mode2 to sub_mb_mode7 are the modes in each of which a subblock is divided into two parts which are aligned horizontally, vertically or diagonally, and different motion vectors are allocated to the two subblocks into which the subblock is divided, respectively. sub_mb_mode8 is the mode in which a subblock is divided into four parts, and different motion vectors are allocated to the four subblocks into which the subblock is divided, respectively.

The block dividing unit 2 divides each frame image of the inputted video signal 1 inputted to the moving image encoding device into macroblock images each having the macroblock size 4 notified thereto by the encoding controlling unit 3. In addition, when an encoding mode 7 notified thereto from the encoding controlling unit 3 includes a mode (one of sub_mb_mode1 to 4 of FIG. 2A or one of sub_mb_mode1 to sub_mb_mode8 of FIG. 2B) in which different encoding modes are respectively allocated to subblocks into which a macroblock is divided, the block dividing unit 2 divides each macroblock image into subblock images shown by the encoding mode 7. Therefore, a block image outputted from the block dividing unit 2 is either one of a macroblock image or a subblock image in accordance with the encoding mode 7. Hereafter, this block image is referred to as a macro/subblock image 5.

When each frame of the inputted video signal 1 has a horizontal or vertical size which is not an integral multiple of the horizontal size or vertical size of the macroblock size 4, a frame (extended frame) in which pixels are additionally provided in a horizontal or vertical direction in such a way that each frame of the inputted video signal 1 has a horizontal or vertical size which is an integral multiple of the horizontal size or vertical size of the macroblock size is generated for each frame of the inputted video signal 1. As a generation method of generating pixels in the extended region when pixels are added to widen each frame in, for example, a vertical direction, there is a method of filling the extended region by repeatedly copying a line of pixels running on a lower edge of the original frame or by repeatedly generating a line of pixels having a fixed pixel value (gray, black, white, or the like). Also when pixels are added to widen each frame in a horizontal direction, there is a method of filling the extended region by repeatedly copying a line of pixels running on a right edge of the original frame or by repeatedly generating a line of pixels having a fixed pixel value (gray, black, white, or the like). The extended frame which is generated for each frame of the inputted video signal 1 and whose frame size is an integral multiple of the macroblock size, instead of each frame image of the inputted video signal 1, is inputted to the block dividing unit 2.

The macroblock size 4 and the frame size (horizontal size and vertical size) of each frame of the inputted video signal 1 are outputted to the variable length encoding unit 23 so as to be multiplexed into the bitstream in units of one sequence which consists of one or more frames or in units of one picture.

The value of the macroblock size can be alternatively defined by a profile or the like, instead of being multiplexed directly into the bitstream. In this case, identification information for identifying the profile on a per-sequence basis is multiplexed into the bitstream.

The switching unit 6 is a switch for switching between the input destinations of the macro/subblock image 5 in accordance with the encoding mode 7. When the encoding mode 7 is the mode in which the macro/subblock image is encoded by using an intra-frame prediction (referred to as the intra-frame prediction mode from here on), this switching unit 6 inputs the macro/subblock image 5 to the intra-prediction unit 8, whereas when the encoding mode 7 is the mode in which the macro/subblock image is encoded by using an inter-frame prediction (referred to as the inter-frame prediction mode from here on), the switching unit inputs the macro/subblock image 5 to the motion-compensated prediction unit 9.

The intra-prediction unit 8 carries out an intra-frame prediction on the macro/subblock image 5 inputted thereto in units of one macro block to be encoded having a size specified by the macroblock size 4 or in units of one subblock specified by the encoding mode 7. The intra-prediction unit 8 generates a prediction image 11 by using the image signal in the frame stored in the memory 28 for intra prediction for each of all intra prediction modes included in the prediction parameters 10 notified thereto from the encoding controlling unit 3.

Hereafter, the details of the prediction parameters 10 will be explained. When the encoding mode 7 is the intra-frame prediction mode, the encoding controlling unit 3 specifies an intra prediction mode as a prediction parameter 10 corresponding to the encoding mode 7. As this intra prediction mode, for example, there can be a mode in which the macroblock or subblock is divided into blocks of 4×4 pixels, and a prediction image is generated by using pixels in the vicinity of a unit block of the image signal stored in the memory 28 for intra prediction, a mode in which the macroblock or subblock is divided into blocks of 8×8 pixels, and a prediction image is generated by using pixels in the vicinity of a unit block of the image signal stored in the memory 28 for intra prediction, a mode in which the macroblock or subblock is divided into blocks of 16×16 pixels, and a prediction image is generated by using pixels in the vicinity of a unit block of the image signal stored in the memory 28 for intra prediction, and a mode in which a prediction image is generated from an image of a reduced inside of the macroblock or subblock.

The motion-compensated prediction unit 9 specifies a reference image 15 which is used for the generation of a prediction image from the data about one or more frames of reference images stored in the motion-compensated prediction frame memory 14, and carries out a motion-compensated prediction by using this reference image 15 and the macro/subblock image 5 in accordance with the encoding mode 7 notified thereto from the encoding controlling unit 3 to generate prediction parameters 18 and a prediction image 17.

Hereafter, the details of the prediction parameters 18 will be explained. When the encoding mode 7 is the inter frame prediction mode, the motion-compensated prediction unit 9 determines motion vectors and the identification number (reference image index) or the like of the reference image indicated by each of the motion vectors as the prediction parameters 18 corresponding to the encoding mode 7. The details of a generation method of generating prediction parameters 18 will be mentioned later.

The subtraction unit 12 subtracts either one of the prediction image 11 and the prediction image 17 from the macro/subblock image 5 to acquire a prediction difference signal 13. The prediction difference signal 13 is generated for each of all the prediction images 11 which the intra-prediction unit 8 generates in accordance with all the intra prediction modes specified by the prediction parameters 10.

The prediction difference signal 13 which is generated in accordance with each of all the intra prediction modes specified by the prediction parameters 10 is evaluated by the encoding controlling unit 3, and optimum prediction parameters 10a including an optimum intra prediction mode are determined. As a method of evaluating the prediction difference signal, the encoding controlling unit uses, for example, a method of calculating an encoding cost $J_2$, which will be mentioned below, by using the compressed data 21 generated by transforming and quantizing the prediction difference signal 13. The encoding controlling unit then selects the intra prediction mode which minimizes the encoding cost $J_2$.

The encoding controlling unit 3 evaluates the prediction difference signal 13 which is generated for each of all the modes included in the encoding modes 7 by either the intra-prediction unit 8 or the motion-compensated prediction unit 9, and determines an optimum encoding mode 7a which provides an optimum degree of encoding efficiency from among the encoding modes 7 on the basis of the result of the evaluation. The encoding controlling unit 3 further determines optimum prediction parameters 10a or 18a and optimum compression parameters 20a corresponding to the optimum encoding mode 7a from the prediction parameters 10 or 18 and the compression parameters 20. A procedure of determining the optimum prediction parameters and a procedure of determining the optimum compression parameters will be mentioned later. As mentioned above, in the case of the intra-frame prediction mode, the intra prediction mode is included in the prediction parameters 10 and in the optimum prediction parameters 10a. In contrast, in the case of the inter frame prediction mode, motion vectors, the identification number (reference image index) of the reference image indicated by each of the motion vectors, etc. are included in the prediction parameters 18 and in the optimum prediction parameters 18a. Further, a transformation block size, a quantization step size, etc. are included in the compression parameters 20 and in the optimum compression parameters 20a.

As the result of carrying out this determining procedure, the encoding controlling unit 3 outputs the optimum encoding mode 7a, the optimum prediction parameters 10a or 18a, and the optimum compression parameters 20a for the macro block or subblock to be encoded to the variable length encoding unit 23. The encoding controlling unit 3 also outputs the optimum compression parameters 20a of the compression parameters 20 to the transformation/quantization unit 19 and to the inverse quantization/inverse transformation unit 22.

The transformation/quantization unit 19 selects the prediction difference signal 13 (referred to as the optimum prediction differential signal 13a from here on) which corresponds to the prediction image 11 or 17 generated on the basis of the optimum encoding mode 7a and the optimum prediction parameters 10a or 18a which the encoding controlling unit 3 has determined from among the plurality of prediction difference signals 13 which are respectively generated for all the modes included in the encoding modes 7, carries out a transforming process, such as a DCT, on this optimum prediction differential signal 13a on the basis of the transformation block size in the optimum compression parameters 20a determined by the encoding controlling unit 3 to calculate transform coefficients and also quantizes these transform coefficients on the basis of the quantization step size in the optimum compression parameters 20a notified thereto from the encoding controlling unit 3, and then outputs the compressed data 21 which are the transform coefficients quantized thereby to the inverse quantization/inverse transformation unit 22 and to the variable length encoding unit 23.

The inverse quantization/inverse transformation unit 22 inverse-quantizes the compressed data 21 inputted thereto from the transformation/quantization unit 19 by using the optimum compression parameters 20a and then carries out an inverse transformation process, such as an inverse DCT, to generate a local decoded prediction difference signal 24 of the prediction difference signal 13a, and outputs this local decoded prediction difference signal 24 to the adding unit 25.

The adding unit 25 adds the local decoded prediction difference signal 24 and the prediction image 11 or 17 to generate a local decoded image signal 26, and outputs this local decoded image signal 26 to the loop filter unit 27 while storing the local decoded image signal in the memory 28 for intra prediction. This local decoded image signal 26 serves as an image signal for intra-frame prediction.

The loop filter unit 27 carries out a predetermined filtering process on the local decoded image signal 26 inputted thereto from the adding unit 25, and stores the local decoded image 29 on which the loop filter unit has carried out the filtering process in the motion-compensated prediction frame memory 14. This local decoded image 29 serves as a reference image 15 for motion-compensated prediction. The filtering process by the loop filter unit 27 can be carried out in units of one macro block of the local decoded image signal 26 inputted to the loop filter unit, or can be carried out on one screenful of macro blocks after the local decoded image signal 26 corresponding to the one screenful of macro blocks are inputted to the loop filter unit.

The variable length encoding unit 23 entropy-encodes the compressed data 21 outputted thereto from the transformation/quantization unit 19, the optimum encoding mode 7a outputted thereto from the encoding controlling unit 3, the optimum prediction parameters 10a or 18a, and the optimum compression parameters 20a to generate a bitstream 30 showing the results of those encodings. The optimum prediction parameters 10a or 18a and the optimum compression parameters 20a are encoded in units of one element in accordance with the encoding mode indicated by the optimum encoding mode 7a.

As mentioned above, in the moving image encoding device in accordance with this Embodiment 1, the motion-compensated prediction unit 9 and the transformation/quantization unit 19 operate in cooperation with the encoding controlling unit 3 to determine the encoding mode, the prediction parameters, and the compression parameters which provide an optimum degree of encoding efficiency (i.e. the optimum encoding mode 7a, the optimum prediction parameters 10a or 18a, and the optimum compression parameters 20a).

Hereafter, the determining procedure, which is carried out by the encoding controlling unit 3, for determining the encoding mode which provides an optimum degree of encoding efficiency, the prediction parameters, and the compression parameters will be explained in the order of 1. the prediction parameters, 2. the compression parameters, and 3. the encoding mode.

1. Procedure for Determining the Prediction Parameters

Hereafter, a procedure for, when the encoding mode 7 is the inter frame prediction mode, determining the prediction parameters 18 including motion vectors related to the inter frame prediction, and the identification number (reference image index) or the like of the reference image indicated by each of the motion vectors will be explained.

The motion-compensated prediction unit 9 determines the prediction parameters 18 for each of all the encoding modes 7 (e.g. the set of encoding modes shown in FIG. 2A or 2B) which are notified from the encoding controlling unit 3 to the motion compensation predicting unit 9, in cooperation with the encoding controlling unit 3. Hereafter, the details of the procedure will be explained.

Figure 3:
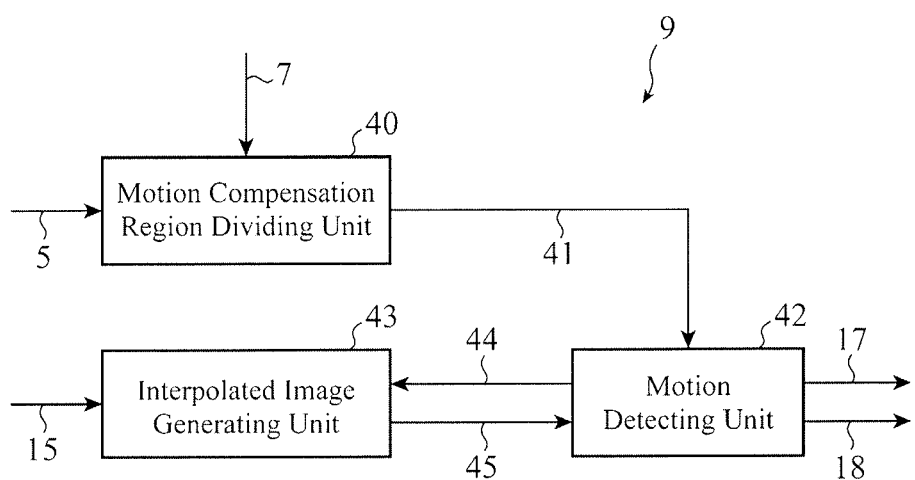
FIG. 3 is a block diagram showing the internal structure of a motion-compensated prediction unit of the moving image encoding device in accordance with Embodiment 1.

FIG. 3 is a block diagram showing the internal structure of the motion-compensated prediction unit 9. The motion-compensated prediction unit 9 shown in FIG. 3 includes a motion compensation region dividing unit 40, a motion detecting unit 42, and an interpolated image generating unit 43. Further, input data inputted to the motion-compensated prediction unit include the encoding mode 7 inputted thereto from the encoding controlling unit 3, the macro/subblock image 5 inputted thereto from the switching unit 6, and the reference image 15 inputted thereto from the motion-compensated prediction frame memory 14.

The motion compensation region dividing unit 40 divides the macro/subblock image 5 inputted from the switching unit 6 into images of blocks each of which is a unit for motion compensation in accordance with the encoding mode 7 notified thereto from the encoding controlling unit 3, and outputs this motion compensation region block image 41 to the motion detecting unit 42.

The interpolated image generating unit 43 specifies the reference image 15 which is used for the generation of a prediction image from the data about the one or more frames of reference images stored in the motion-compensated prediction frame memory 14, and the motion detecting unit 42 detects a motion vector 44 in a predetermined motion search range on the reference image 15 specified by the interpolated image generating unit. The motion detecting unit carries out the detection of the motion vector by using a motion vector having virtual sample accuracy, like in the case of the MPEG-4 AVC standards or the like. This detecting method includes the steps of, for pixel information (referred to as integer pixels) which the reference image has, generating virtual samples (pixels) between integer pixels by implementing an interpolation arithmetic operation on the integer pixels, and using the virtual samples as a prediction image. In the case of the MPEG-4 AVC standards, in accordance with the detecting method, virtual samples having ⅛-pixel accuracy can be generated and used. In the case of the MPEG-4 AVC standards, virtual samples having ½ pixel accuracy are generated by implementing an interpolation arithmetic operation with a 6-tap filter using six integer pixels running in a vertical or horizontal direction. Virtual samples having ¼ pixel accuracy are generated by implementing an interpolation arithmetic operation using a filter for acquiring a mean value of adjacent ½ pixels or integer pixels.

Also in the motion-compensated prediction unit 9 in accordance with this Embodiment 1, the interpolated image generating unit 43 generates a prediction image 45 of virtual pixels in accordance with the accuracy of the motion vector 44 notified thereto from the motion detecting unit 42. Hereafter, an example of a detection procedure for detecting a motion vector having virtual pixel accuracy will be shown.

Motion Vector Detection Procedure I

The interpolated image generating unit 43 generates a prediction image 45 for the motion vector 44 having integer pixel accuracy in the predetermined motion search range of the motion compensation region block image 41. The prediction image 45 (prediction image 17) generated at integer pixel accuracy is outputted to the subtraction unit 12 and is subtracted from the motion compensation region block image 41 (macro/subblock image 5) by the subtraction unit 12, so that the result of the subtraction is defined as a prediction difference signal 13. The encoding controlling unit 3 evaluates a degree of prediction efficiency for the prediction difference signal 13 and for the motion vector 44 (prediction parameter 18) having integer pixel accuracy. In the evaluation of the degree of prediction efficiency, a prediction cost $J_1$ is calculated in accordance with, for example, the following equation (1), and the motion vector 44 having integer pixel accuracy which minimizes the prediction cost $J_1$ in the predetermined motion search range is determined.

$$J_1 = D_1 + \lambda R_1 \qquad (1)$$

It is assumed that $D_1$ and $R_1$ are used as evaluated values. $D_1$ is the sum of absolute values (SAD) in the macroblock or subblock of the prediction difference signal, $R_1$ is an estimated code amount of the motion vector and the identification number of the reference image indicated by this motion vector, and $\lambda$ is a positive number.

When determining the evaluated value $R_1$, the code amount of the motion vector is predicted by using the value of an adjacent motion vector as the value of the motion vector in each mode shown in FIG. 2A or 2B, and the prediction difference value is entropy-encoded on the basis of a probability distribution. As an alternative, the evaluated value is determined by carrying out an estimation of a code amount corresponding to the evaluated value.

FIG. 4 is a view explaining a determining method of determining a predicted value of the motion vector (referred to as a predicted vector from here on) in each encoding mode 7 shown in FIG. 2B. Referring to FIG. 4, for a rectangular block in mb_mode0, sub_mb_mode1, or the like, a predicted vector PMV of this rectangular block is calculated in accordance with the following equation (2) by using already-encoded motion vectors MVa, MVb, and MVc of blocks located on a left side (position A), an upper side (position B), and an upper right side (position C) of the rectangular block. median( ) corresponds to a median filter process and is a function of outputting the median of the motion vectors MVa, MVb, and MVc.

$$PMV = \text{median}(MVa, MVb, MVc) \qquad (2)$$

In contrast, in the case of L-shaped blocks having an L-letter shape mb_mode1, sub_mb_mode2, mb_mode2, sub_mb_mode3, mb_mode3, sub_mb_mode4, mb_mode4, and sub_mb_mode5, the positions A, B, and C on which the median is operated are changed in accordance with the L-letter shape in order to make it possible to apply the same process as that performed on rectangular blocks to each L-shaped block. As a result, a predicted value of the motion vector can be calculated in accordance with the shape of each motion vector allocation region without changing the method of calculating a predicted vector PMV, and the cost of the evaluated value $R_1$ can be reduced to a small one.

Motion Vector Detection Procedure II

The interpolated image generating unit 43 generates a prediction image 45 for one or more motion vectors 44 having ½ pixel accuracy located in the vicinity of the motion vector having integer pixel accuracy which is determined in accordance with the above-mentioned "motion vector detection procedure I". After that, in the same way that the above-mentioned "motion vector detection procedure I" is carried out, the prediction image 45 (prediction image 17) generated at ½ pixel accuracy is subtracted from the motion compensation region block image 41 (macro/subblock image 5) by the subtraction unit 12, so that a prediction difference signal 13 is acquired. Next, the encoding controlling unit 3 evaluates a degree of prediction efficiency for this prediction difference signal 13 and for the motion vector 44 (prediction parameter 18) having ½ pixel accuracy, and determines a motion vector 44 having ½ pixel accuracy which minimizes the prediction cost $J_1$ from the one or more motion vectors having ½ pixel accuracy located in the vicinity of the motion vector having integer pixel accuracy.

Motion Vector Detection Procedure III

Also for motion vectors having ¼ pixel accuracy, the encoding controlling unit 3 and the motion-compensated prediction unit 9 determine a motion vector 44 having ¼ pixel accuracy which minimizes the prediction cost $J_1$ from one or more motion vectors having ¼ pixel accuracy located in the vicinity of the motion vector having ½ pixel accuracy which is determined in accordance with the above-mentioned "motion vector detection procedure II".

Motion Vector Detection Procedure IV

After that, the encoding controlling unit 3 and the motion-compensated prediction unit 9 similarly detect a motion vector having virtual pixel accuracy until the motion vector detected thereby has a predetermined degree of accuracy.

Although in this embodiment, the example in which the encoding controlling unit and the motion-compensated prediction unit detect a motion vector having virtual pixel accuracy until the motion vector detected thereby has a predetermined degree of accuracy is shown, the detection of a motion vector having virtual pixel accuracy can be aborted when, for example, a threshold for the prediction cost is predetermined and the prediction cost $J_1$ becomes smaller than the predetermined threshold before the motion vector detected has a predetermined degree of accuracy.

The motion vector can be made to refer to a pixel located outside the frame defined by the reference frame size. In this case, it is necessary to generate pixels located outside the frame. As a method of generating pixels located outside the frame, there is a method of filling an outside region with pixels running on a screen edge of the frame.

When the frame size of each frame of the inputted video signal 1 is not an integral multiple of macroblock size and an extended frame is inputted instead of each frame of the inputted video signal 1, the size which is extended to an integral multiple of the macroblock size (the size of the extended frame) is defined as the frame size of the reference frame. In contrast, when the local decoded portion of the extended region is not referred to, but only the local decoded portion of the original frame is referred to as pixels in the frame, the frame size of the original inputted video signal is defined as the frame size of the reference frame.

For the motion compensation region block image 41 of each of a plurality of bocks into which the macro/subblock image 5 is divided and which is a unit for the motion compensation indicated by the encoding mode 7, the motion-compensated prediction unit 9 outputs both the virtual pixel accurate motion vector having a predetermined degree of accuracy which is determined for the motion compensation region block image, and the identification number of the reference image indicated by the motion vector as the prediction parameters 18. The motion-compensated prediction unit 9 also outputs the prediction image 45 (prediction image 17) generated using the prediction parameters 18 to the subtraction unit 12, and the prediction image is subtracted from the macro/subblock image 5 by the subtraction unit 12, so that a prediction difference signal 13 is acquired. The prediction difference signal 13 outputted from the subtraction unit 12 is outputted to the transformation/quantization unit 19.

2. Determining Procedure for Determining the Compression Parameters

Hereafter, the procedure for determining a compression parameter 20 (transformation block size) which is used when carrying out a transformation and quantization process on the prediction difference signal 13 generated on the basis of the prediction parameters 18 determined for each encoding mode 7 in accordance with the above-mentioned "1. Determining procedure for determining the prediction parameters" will be explained.

Figure 5:
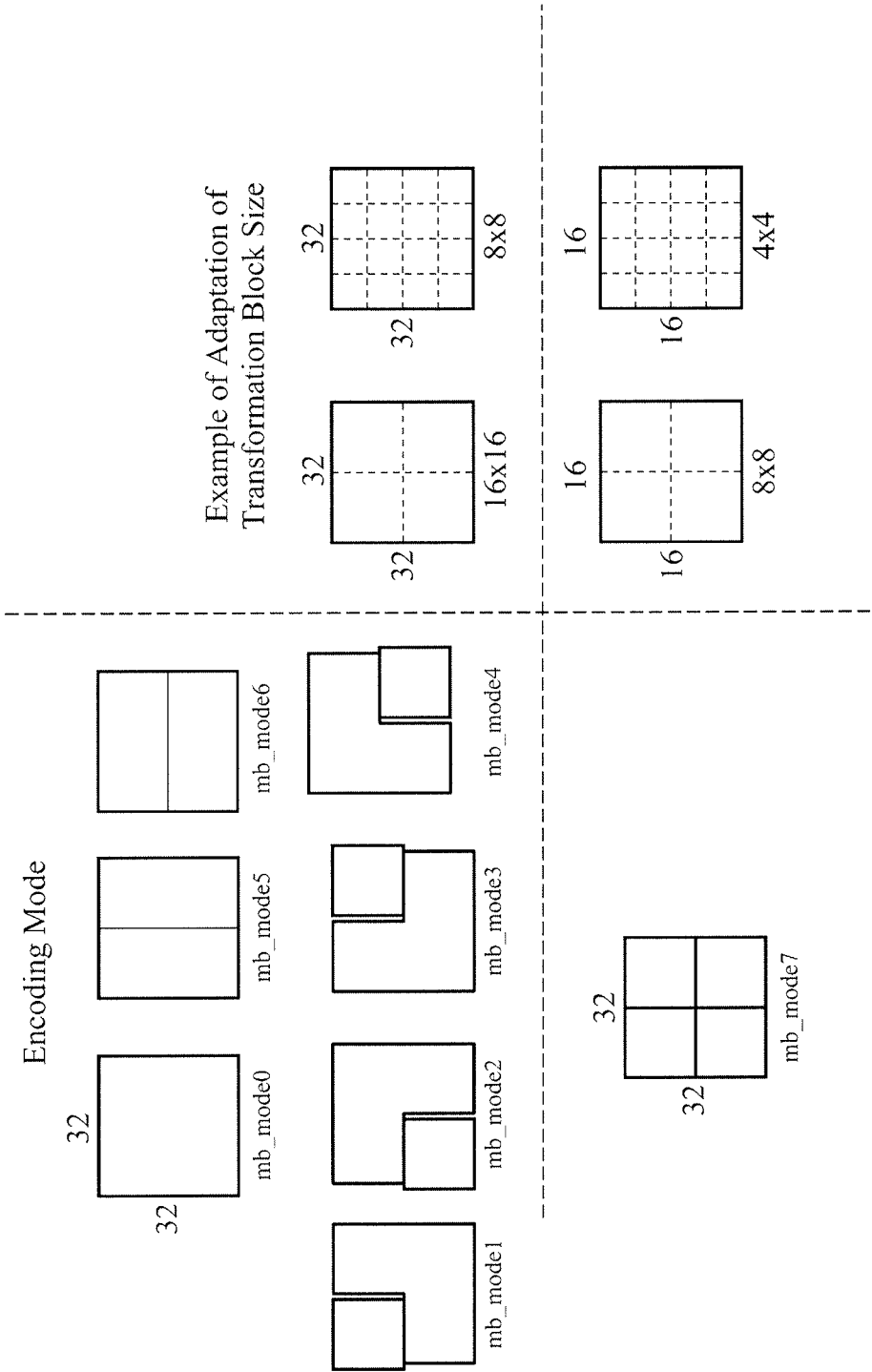
FIG. 5 is a view showing an example of adaptation of a transformation block size in accordance with an encoding mode.

FIG. 5 is a view showing an example of adaptation of the transformation block size in accordance with an encoding mode 7 shown in FIG. 2B. Referring to FIG. 5, a block of 32×32 pixels is used as an example of a block of M×L pixels. When the mode indicated by the encoding mode 7 is one of mb_mode0 to mb_mode6, either the size of 16×16 pixels or the size of 8×8 pixels is adaptively selectable as the transformation block size. When the encoding mode 7 indicates mb_mode7, either the size of 8×8 pixels or the size of 4×4 pixels is adaptively selectable as the transformation block size for each of 16×16 pixel subblocks into which each macroblock is divided. The set of selectable transformation block sizes for each encoding mode can be defined from among arbitrary rectangular block sizes each of which is equal to or smaller than the size of equal subblocks into which a macroblock is divided in accordance with the encoding mode.

Figure 6:
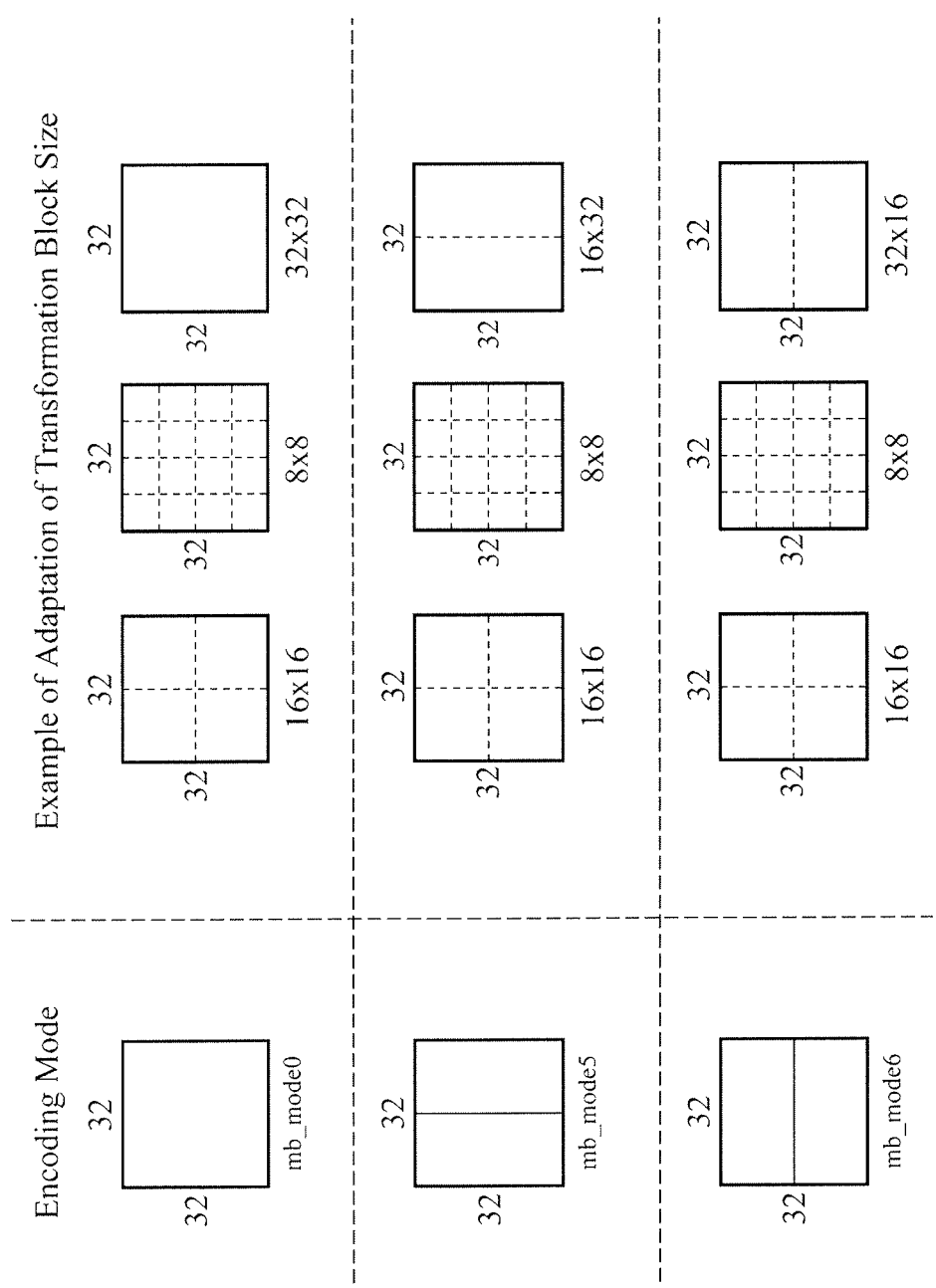
FIG. 6 is a view showing another example of the adaptation of a transformation block size in accordance with an encoding mode.

FIG. 6 is a view showing another example of the adaptation of the transformation block size in accordance with an encoding mode 7 shown in FIG. 2B. In the example of FIG. 6, when the mode indicated by the encoding mode 7 is the above-mentioned mb_mode0, mb_mode5, or mb_mode6, in addition to the size of 16×16 pixels and the size of 8×8 pixels, the transformation block size in accordance with the shape of each subblock which is a unit for the motion compensation is selectable as a selectable transformation block size. In the case of mb_mode0, the transformation block size is adaptively selectable from among the size of 16×16 pixels, the size of 8×8 pixels, and the size of 32×32 pixels. In the case of mb_mode5, the transformation block size is adaptively selectable from among the size of 16×16 pixels, the size of 8×8 pixels, and the size of 16×32 pixels. In the case of mb_mode6, the transformation block size is adaptively selectable from among the size of 16×16 pixels, the size of 8×8 pixels, and the size of 32×16 pixels. Further, although not illustrated, in the case of mb_mode7, the transformation block size is adaptively selectable from among the size of 16×16 pixels, the size of 8×8 pixels, and the size of 16×32 pixels. In the case of one of mb_mode1 to mb_mode4, the adaptation can be carried out in such a way that the transformation block size is selected from the size of 16×16 pixels and the size of 8×8 pixels for a region which is not a rectangle, while the transformation block size is selected from the size of 8×8 pixels and the size of 4×4 pixels for a region which is a rectangle.

The encoding controlling unit 3 defines the set of transformation block sizes in accordance with the encoding mode 7 illustrated in FIGS. 5 and 6 as a compression parameter 20. Although in the examples shown in FIGS. 5 and 6, the set of selectable transformation block sizes is determined in advance in accordance with the encoding mode 7 of each macroblock, and a transformation block size can be selected adaptively for each macroblock or subblock, the set of selectable transformation block sizes can be alternatively determined in advance in accordance with the encoding mode 7 (one of sub_mb_mode1 to sub_mb_mode8 shown in FIG. 2B) of each of subblocks into which each macroblock is similarly divided, and a transformation block size can be selected adaptively for each of the subblocks or each of blocks into which each subblock is further divided. Similarly, when an encoding mode 7 shown in FIG. 2A is used, the encoding controlling unit 3 can determine the set of transformation block sizes in accordance with the encoding mode 7 in advance, and can adaptively select a transformation block size from the set.

The transformation/quantization unit 19 determines an optimum transformation block size from the transformation block sizes in units of one macroblock having a size specified by the macroblock size 4 or in units of one of subblocks into which each macroblock is further divided in accordance with the encoding mode 7, in cooperation with the encoding controlling unit 3. Hereafter, the details of a procedure for determining an optimum transformation block size will be explained.

Figure 7:
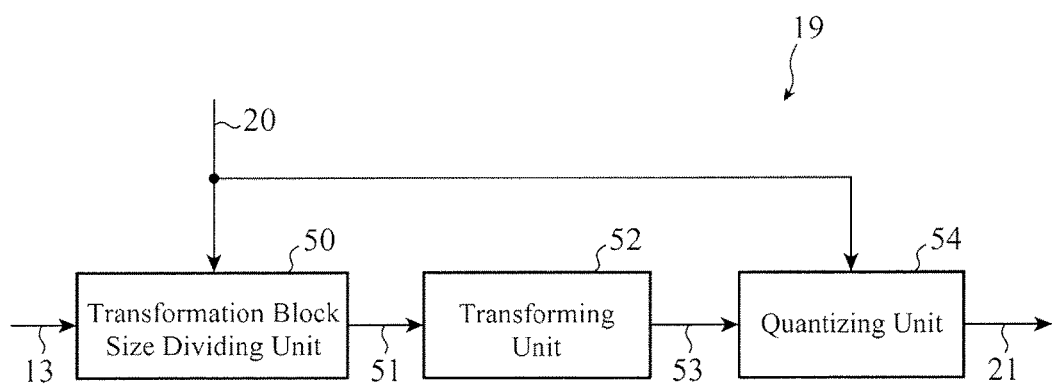
FIG. 7 is a block diagram showing the internal structure of a transformation/quantization unit of the moving image encoding device in accordance with Embodiment 1.

FIG. 7 is a block diagram showing the internal structure of the transformation/quantization unit 19. The transformation/quantization unit 19 shown in FIG. 7 includes a transformation block size dividing unit 50, a transforming unit 52, and a quantizing unit 54. Further, input data inputted to the transformation/quantization unit include the compression parameters 20 (the transformation block size, the quantization step size, etc.) inputted thereto from the encoding controlling unit 3 and the prediction difference signal 13 inputted thereto from the encoding controlling unit 3.

The transformation block size dividing unit 50 converts the prediction difference signal 13 of each macroblock or subblock which is the target for determination of the transformation block size into blocks in accordance with the transformation block size in the compression parameters 20, and outputs each of the blocks to the transforming unit 52 as a transformation target block 51. When a plurality of transformation block sizes are selected and specified for one macroblock or subblock by the compression parameters 20, the plurality of transformation block sizes of transformation target blocks 51 are sequentially outputted to the transforming unit 52.

The transforming unit 52 carries out a DCT, an integer transformation in which the transform coefficients of a DCT are approximated by integers, and a transforming process in accordance with a transforming method, such as Hadamard transform, on the transformation object block 51 inputted thereto to generate transform coefficients 53, and outputs the transform coefficients 53 generated thereby to the quantizing unit 54.

The quantizing unit 54 quantizes the transform coefficients 53 inputted thereto in accordance with the quantization step size in the compression parameters 20 notified thereto from the encoding controlling unit 3, and outputs compressed data 21 which are the transform coefficients quantized to the inverse quantization/inverse transformation unit 22 and to the encoding controlling unit 3. When a plurality of transformation block sizes are selected and specified for one macroblock or subblock by the compression parameters 20, the transforming unit 52 and the quantizing unit 54 carry out the above-mentioned transformation and quantization process on all the transformation block sizes of transformation target blocks, and outputs the compressed data 21 associated with each of all the transformation block sizes.

The compressed data 21 outputted from the quantizing unit 54 are inputted to the encoding controlling unit 3, and are used for the evaluation of a degree of encoding efficiency for the transformation block size in the compression parameters 20. The encoding controlling unit 3 uses the compressed data 21 acquired for each of all the selectable transformation block sizes in each encoding mode included in the encoding modes 7 to calculate an encoding cost $J_2$ in accordance with, for example, the following equation (3), and to select the transformation block size which minimizes the encoding cost $J_2$ from among the selectable transformation block sizes.

$$J_2 = D_2 + \lambda R_2 \qquad (3)$$

It is assumed that $D_2$ and $R_2$ are used as evaluated values. As $D_2$, the distortion sum of squared differences or the like between the local decoded image signal 26, which is acquired by inputting the compressed data 21 acquired for the transformation block size to the inverse quantization/inverse transformation unit 22, and adding the prediction image 17 to a local decoded prediction difference signal 24 which is acquired by carrying out an inverse transformation and inverse quantization process on the compressed data 21, and the macro/subblock image 5 can be used. As $R_2$, the code amount (or estimated code amount) acquired by actually encoding the compressed data 21 acquired for the transformation block size, and the encoding mode 7 and the prediction parameters 10 or 18 associated with the compressed data 21 by means of the variable length encoding unit 23 is used.

After determining the optimum encoding mode 7a in accordance with "3. Determining procedure for determining the encoding mode" which will be mentioned below, the encoding controlling unit 3 selects the transformation block size corresponding to the determined optimum encoding mode 7a and includes the transformation block size in the optimum compression parameters 20a, and then outputs the optimum compression parameters to the variable length encoding unit 23. After entropy-encoding these optimum compression parameters 20a, the variable length encoding unit 23 multiplexes the optimum compression parameters entropy-encoded thereby into the bitstream 30.

Because the transformation block size is selected from among the set of transformation block sizes (illustrated in FIGS. 5 and 6) which are defined in advance in accordance with the optimum encoding mode 7a of the macroblock or subblock, what is necessary is just to assign identification information, such as an ID, to each transformation block size included in each set of transformation block sizes, entropy-encode the identification information as information about the transformation block size, and multiplex the identification information into the bitstream 30. In this case, the identification information of each set of transformation block sizes is set up in advance in the decoding device. However, because the decoding device can determine the transformation block size automatically from the set of transformation block sizes when only one transformation block size is included in the set of transformation block sizes, the encoding device does not have to multiplex the identification information of the transformation block size into the bitstream 30.

3. Determining Procedure of Determining the Encoding Mode

After the prediction parameters 10 or 18 and the compression parameters 20 for each of all the encoding modes 7 specified by the encoding controlling unit 3 are determined in accordance with the above-mentioned "1. Determining procedure for determining the prediction parameters", and "2. Determining procedure for determining the compression parameters", the encoding controlling unit 3 uses the compressed data 21 which are acquired by further transforming and quantizing the prediction difference signal 13 which is acquired by using each of the encoding modes 7, and the prediction parameters 10 or 18 and the compression parameters 20 in that encoding mode to determine the encoding mode 7 which reduces the encoding cost $J_2$ to a minimum in accordance with the above-mentioned equation (3), and selects the encoding mode 7 as the optimum encoding mode 7a of the macroblock currently being processed.

As an alternative, the encoding controlling unit can determine the optimum encoding mode 7a from among all the encoding modes including a skip mode as a mode of the macroblock or subblock in addition to the encoding modes shown in FIG. 2A 2B. The skip mode is the mode in which a prediction image on which motion compensation is carried out by using the motion vector of an adjacent macroblock or subblock is defined as the local decoded image signal in the encoding device. Because it is not necessary to calculate the prediction parameters other than the encoding modes, and the compression parameters to multiplex them into the bitstream, the inputted image can be encoded while the code amount is suppressed. The decoding device outputs the prediction image on which motion compensation is carried out by using the motion vector of an adjacent macroblock or subblock in accordance with the same procedure as that carried out by the encoding device as the decoded image signal.

When the frame size of each frame of the inputted video signal 1 is not an integral multiple of the macroblock size and an extended frame is inputted instead of each frame of the inputted video signal 1, a control operation of selecting only the skip mode for a macroblock or subblock including an extended region can be carried out, and an encoding mode can be determined in such a way that the code amount spent on the extended region can be suppressed.

The encoding controlling unit 3 outputs the optimum encoding mode 7a providing the optimum degree of encoding efficiency which is determined in accordance with the above-mentioned "1. Determining procedure for determining the prediction parameters", "2. Determining procedure for determining the compression parameters", and "3. Determining procedure for determining the encoding mode" to the variable length encoding unit 23, while selecting the prediction parameters 10 or 18 corresponding to the optimum encoding mode 7a as the optimum prediction parameters 10a or 18a and similarly selecting the compression parameters 20 corresponding to the optimum encoding mode 7a as the optimum compression parameters 20a, and then outputting these optimum prediction and compression parameters to the variable length encoding unit 23. The variable length encoding unit 23 entropy-encodes the optimum encoding mode 7a, the optimum prediction parameters 10a or 18a, and the optimum compression parameters 20a, and then multiplexes them into the bitstream 30.

Further, the optimum prediction differential signal 13a acquired from the prediction image 11 or 17 based on the optimum encoding mode 7a, the optimum prediction parameters 10a or 18a, and the optimum compression parameter 20a which are determined as above is transformed and quantized into compressed data 21 by the transformation/quantization unit 19, as mentioned above, and these compressed data 21 are entropy-encoded by the variable length encoding unit 23 and are multiplexed into the bitstream 30. Further, these compressed data 21 are made to pass via the inverse quantization/inverse transformation unit 22 and the adding unit 25, and then become a local decoded image signal 26 and are inputted to the loop filter unit 27.

Figure 8:
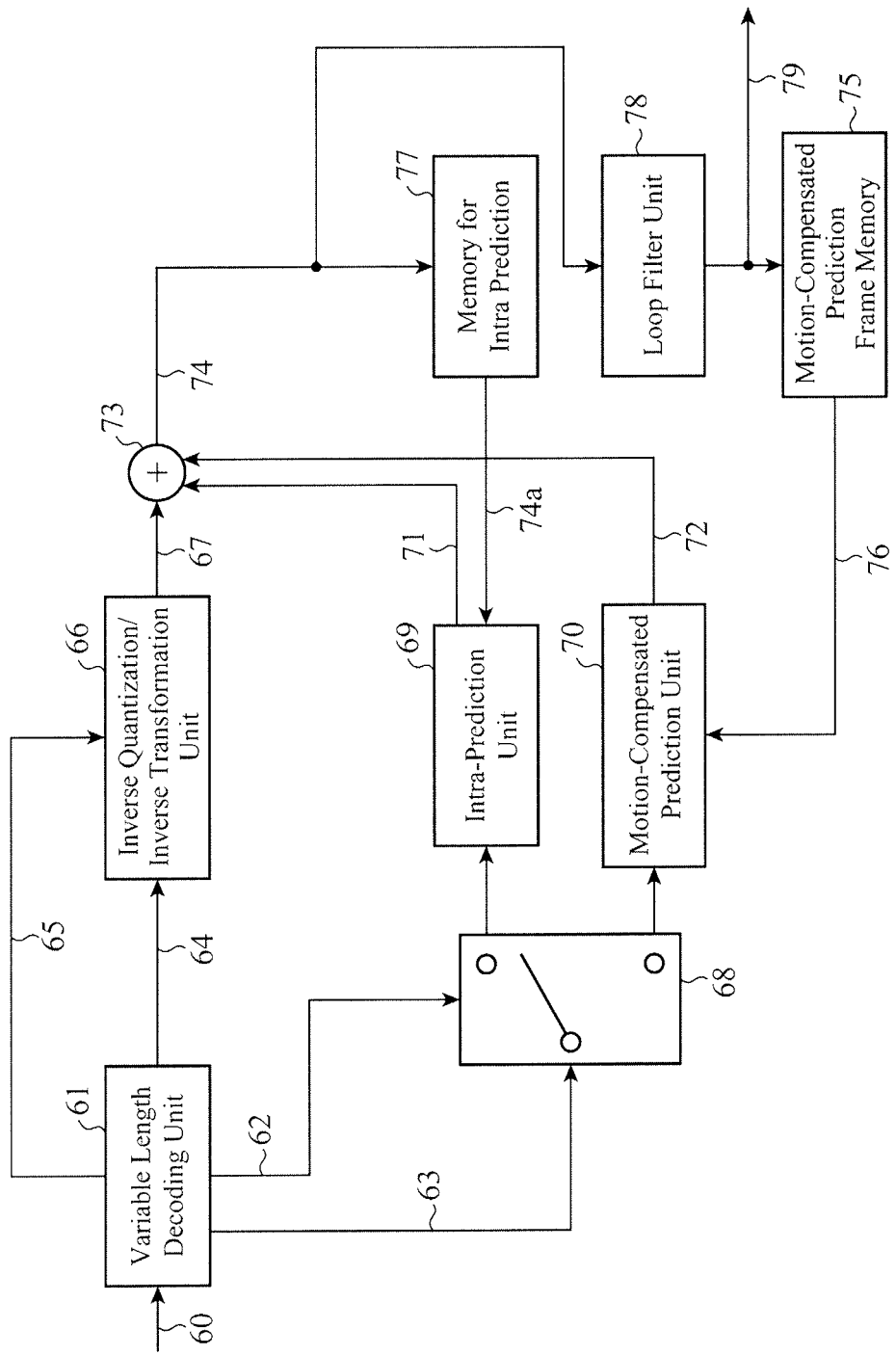
FIG. 8 is a block diagram showing the structure of a moving image decoding device in accordance with Embodiment 1 of the present invention.

Next, the moving image decoding device in accordance with this Embodiment 1 will be explained. FIG. 8 is a block diagram showing the structure of the moving image decoding device in accordance with Embodiment 1 of the present invention. The moving image decoding device shown in FIG. 8 includes a variable length decoding unit 61 for entropy-decoding the optimum encoding mode 62 multiplexed into the bitstream 60 in units of one macroblock to while entropy-decoding the optimum prediction parameters 63, the compressed data 64, and the optimum compression parameters 65 from the bitstream 60 in units of one macroblock or subblock divided in accordance with the decoded optimum encoding mode 62, an intra-prediction unit 69 for, when the optimum prediction parameters 63 are inputted, generating a prediction image 71 by using the intra prediction mode included in the optimum prediction parameters 63, and a decoded image 74a stored in a memory 77 for intra prediction, a motion-compensated prediction unit 70 for, when the optimum prediction parameters 63 are inputted, carrying out a motion-compensated prediction by using the motion vector included in the optimum prediction parameters 63, and the reference image 76 in a motion-compensated prediction frame memory 75 which is specified by the reference image index included in the optimum prediction parameters 63 to generate a prediction image 72, a switching unit 68 for inputting the optimum prediction parameters 63 which the variable length decoding unit 61 has decoded to either one of the intra-prediction unit 69 and the motion-compensated prediction unit 70 in accordance with the decoded optimum encoding mode 62, an inverse quantization/inverse transformation unit 66 for carrying out an inverse quantization and inverse transformation process on the compressed data 64 by using the optimum compression parameters 65 to generate prediction difference signal decoded values 67, an adding unit 73 for adding the prediction image 71 or 72 outputted from either one of the intra-prediction unit 69 and the motion-compensated prediction unit 70 to the prediction difference signal decoded values 67 to generate a decoded image 74, the memory 77 for intra prediction for storing the decoded image 74, a loop filter unit 78 for carrying out filtering on the decoded image 74 to generate a reproduced image 79, and the motion-compensated prediction frame memory 75 for storing the reproduced image 79.

When the moving image decoding device in accordance with this Embodiment 1 receives the bitstream 60, the variable length decoding unit 61 carries out an entropy decoding process on the bitstream 60 to acquire the macroblock size and the frame size in units of one sequence which consists of one or more frames of pictures or in units of one picture. In a case in which the macroblock size is defined by a profile or the like without being multiplexed directly into the bitstream, the macroblock size is determined on the basis of the identification information of the profile which is decoded from the bitstream in units of one sequence. The number of macroblocks included in each frame is determined on the basis of the decoded macroblock size of each frame and the decoded frame size, and the optimum encoding mode 62, the optimum prediction parameters 63, the compressed data 64 (i.e. quantized and transformed coefficient data), the optimum compression parameters 65 (the transformation block size information and the quantization step size), etc. of each macroblock included in the frame are decoded. The optimum encoding mode 62, the optimum prediction parameters 63, the compressed data 64, and the optimum compression parameters 65 which are decoded by the decoding device correspond to the optimum encoding mode 7a, the optimum prediction parameters 10a or 18a, the compressed data 21, and the optimum compression parameters 20a which are encoded by the encoding device, respectively.

At this time, because the transformation block size information in the optimum compression parameters 65 is the identification information for identifying the transformation block size which has been selected from the set of transformation block sizes defined in advance for each macroblock or subblock (or on a per-macroblock or per-subblock basis) in accordance with the encoding mode 7 by the encoding device, the decoding device specifies the transformation block size of the macroblock or subblock from the optimum encoding mode 62 and the transformation block size information in the optimum compression parameters 65.

The inverse quantization/inverse transformation unit 66 carries out an inverse quantization and inverse transformation process by using the compressed data 64 and the optimum compression parameters 65 which are inputted from the variable length decoding unit 61 in units of one block whose size is specified by the transformation block size information to calculate prediction difference signal decoded values 67.

Further, when decoding the motion vector, the variable length decoding unit 61 refers to the motion vectors of already-decoded peripheral blocks, and determines a predicted vector by carrying out a process shown in FIG. 4 to acquire a decoded value of the motion vector by adding the prediction difference values decoded from the bitstream 60 to the predicted vector. The variable length decoding unit 61 includes the decoded value of this motion vector in the optimum prediction parameters 63, and outputs these optimum prediction parameters to the switching unit 68.

The switching unit 68 is a switch for switching between the input destinations of the optimum prediction parameters 63 in accordance with the optimum encoding mode 62. When the optimum encoding mode 62 inputted from the variable length decoding unit 61 shows the intra-frame prediction mode, this switching unit 68 outputs the optimum prediction parameters 63 (intra prediction mode) similarly inputted from the variable length decoding unit 61 to the intra-prediction unit 69, whereas when the optimum encoding mode 62 shows the inter frame prediction mode, the switching unit outputs the optimum prediction parameters 63 (the motion vectors, the identification number (reference image index) of the reference image indicated by each of the motion vectors, etc.) to the motion-compensated prediction unit 70.

The intra-prediction unit 69 refers to the decoded image 74a in the frame stored in the memory 77 for intra prediction (decoded image signal in the frame), and generates and outputs a prediction image 71 corresponding to the intra prediction mode indicated by the optimum prediction parameters 63.

Although a generation method of generating a prediction image 71 which the intra-prediction unit 69 uses is the same as the operation carried out by the intra-prediction unit 8 in the encoding device, the intra-prediction unit 8 generates a prediction image 11 corresponding to each of all the intra prediction modes indicated by the encoding modes 7, while the intra-prediction unit 69 differs from the intra-prediction unit 8 in that the intra-prediction unit 69 generates only a prediction image 71 corresponding to the intra prediction mode indicated by the optimum encoding mode 62.

The motion-compensated prediction unit 70 generates a prediction image 72 from the one or more frames of reference images 76 stored in the motion-compensated prediction frame memory 75 on the basis of the motion vector, the reference image index, and so on which are indicated by the inputted optimum prediction parameters 63, and outputs the prediction image 72.

A generation method of generating a prediction image 72 which is implemented by the motion-compensated prediction unit 70 corresponds to the operation of the motion-compensated prediction unit 9 in the encoding device from which the process of searching through a plurality of reference images for motion vectors (corresponding to the operations of the motion detecting unit 42 and the interpolated image generating unit 43 shown in FIG. 3) is excluded. The motion-compensated prediction unit carries out only the process of generating a prediction image 72 in accordance with the optimum prediction parameters 63 provided thereto from the variable length decoding unit 61. When the motion vector is made to refer to a pixel located outside the frame which is defined by the reference frame size, the motion-compensated prediction unit 70 generates a prediction image 72 by using, for example, a method of filling a pixel region located outside the frame with pixels running on a screen edge of the frame, like that of the encoding device. The reference frame size can be defined by the decoded frame size which is extended in such a way as to be an integral multiple of the decoded macroblock size, or can be defined by the decoded frame size, and the decoding device determines the reference frame size in accordance with the same procedure as that carried out by the encoding device.

The adding unit 73 adds either one of the prediction image 71 and the prediction image 72 and the prediction difference signal decoded values 67 outputted thereto from the inverse quantization/inverse transformation unit 66 to generate a decoded image 74.

While this decoded image 74 is stored in the memory 77 for intra prediction in order to use the decoded image as a reference image (decoded image 74a) for generation of an intra prediction image for a subsequent macroblock, the decoded image 74 is inputted to the loop filter unit 78.

The loop filter unit 78 carries out the same operation as that of the loop filter unit 27 in the encoding device to generate a reproduced image 79, and outputs this reproduced image to outside the moving image decoding device. Further, this reproduced image 79 is stored in the motion-compensated prediction frame memory 75 in order to use the reproduced image as a reference image 76 for subsequent generation of a prediction image. The size of the reproduced image acquired after decoding all the macroblocks in the frame is an integral multiple of the macroblock size. When the size of the reproduced image is larger than the decoded frame size corresponding to the frame size of each frame of the video signal inputted to the encoding device, an extended region which is extended in a horizontal or vertical direction is included in the reproduced image. In this case, a decoded image in which the decoded image of the extended region is removed from the reproduced image is outputted from the decoding device.

When the reference frame size is defined by the decoded frame size, the decoded image of the extended region of the reproduced image stored in the motion-compensated prediction frame memory 75 is not referred to for subsequent generation of a prediction image. Therefore, the decoded image in which the decoded image of the extended region is removed from the reproduced image can be stored in the motion-compensated prediction frame memory 75.

As mentioned above, because the moving image encoding device in accordance with Embodiment 1 is constructed in such a way that for each of macro/subblock images 5 into which an inputted moving image is divided in accordance with the encoding mode 7 of each macroblock, the moving image encoding device predetermines a set of transformation blocks including a plurality of transformation block sizes in accordance with the size of a macroblock or subblock, the encoding controlling unit 3 selects one transformation block size which provides an optimum degree of encoding efficiency from the set of transformation block sizes and includes the transformation block size selected thereby in optimum compression parameters 20a, and then notifies these optimum compression parameters to the transformation/quantization unit 19, and the transformation/quantization unit 19 divides an optimum prediction differential signal 13a into blocks each having the transformation block size included in the optimum compression parameters 20a, and carries out a transformation and quantization process on each of the blocks to generate compressed data 21, the moving image encoding device can improve the quality of the encoded video with a similar code amount as compared with a conventional method of using a fixed set of transformation block sizes irrespective of the size of a macroblock or subblock.

Further, while the variable length encoding unit 23 is constructed in such a way as to multiplex the transformation block size which is adaptively selected in accordance with the encoding mode 7 from the set of transformation block sizes into the bitstream 30, the moving image decoding device in accordance with Embodiment 1 is constructed in such a way that the variable length decoding unit 61 decodes the optimum compression parameters 65 from the bitstream 60 in units of one macroblock or subblock (or on a per-macroblock or per-subblock basis), and the inverse quantization/inverse transformation unit 66 determines a transformation block size on the basis of the transformation block size information included in these optimum compression parameters 65 and carries out an inverse transformation and inverse quantization process on the compressed data 64 in units of one block having the transformation block size. Therefore, because the moving image decoding device can select the transformation block size which has been used by the encoding device from the set of transformation block sizes which is defined in the same way that the set of transformation block sizes is defined by the moving image encoding device to decode the compressed data, the moving image decoding device can correctly decode the bitstream encoded by the moving image encoding device in accordance with Embodiment 1.

Embodiment 2.

In this Embodiment 2, a variant of the variable length encoding unit 23 of the moving image encoding device in accordance with above-mentioned Embodiment 1 will be explained, and a variant of the variable length decoding unit 61 of the moving image decoding device in accordance with above-mentioned Embodiment 1 will be explained similarly.

Figure 9:
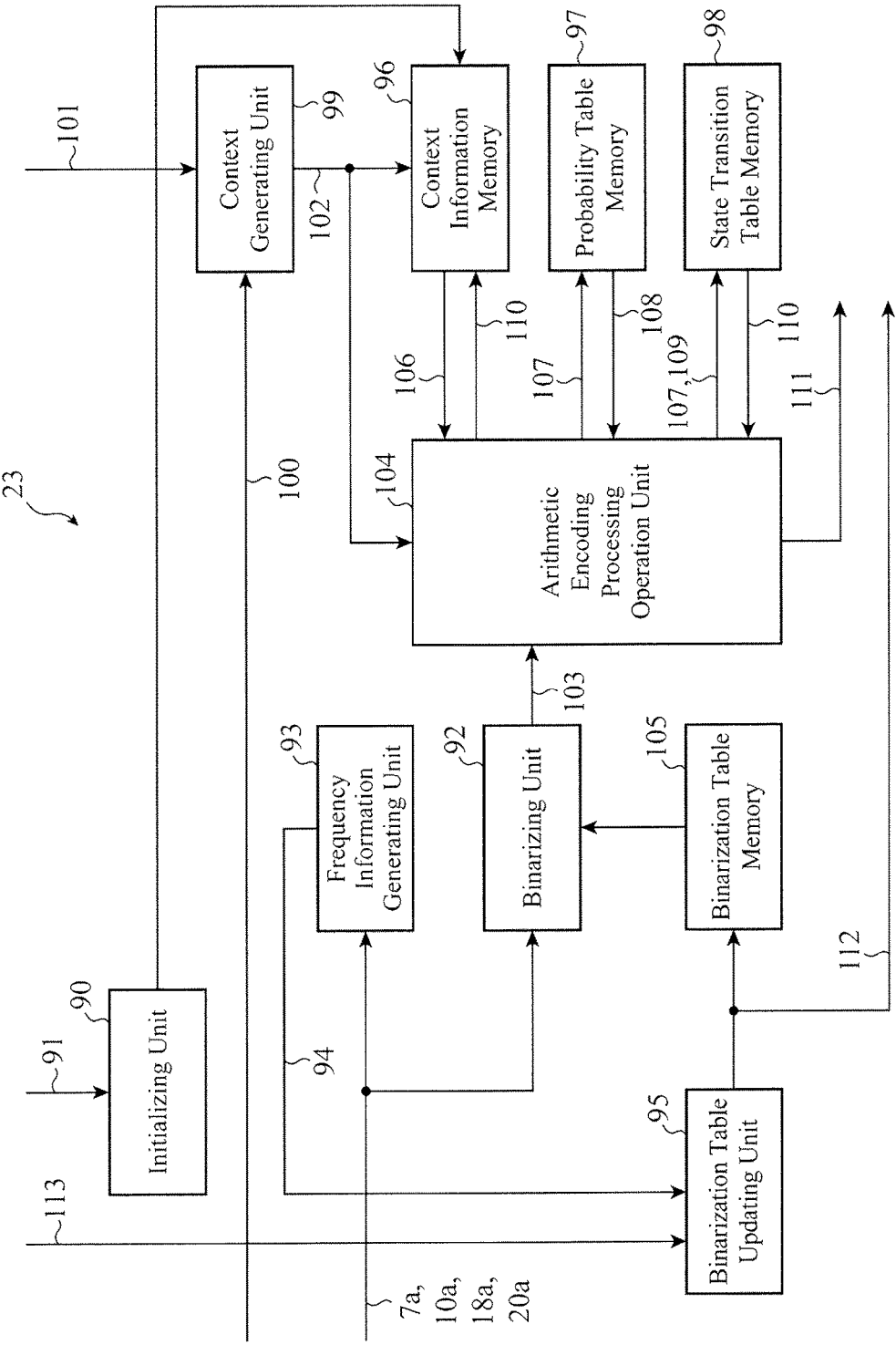
FIG. 9 is a block diagram showing the internal structure of a variable length encoding unit of a moving image encoding device in accordance with Embodiment 2 of the present invention.

First, a variable length encoding unit 23 of a moving image encoding device in accordance with this Embodiment 2 will be explained. FIG. 9 is a block diagram showing the internal structure of the variable length encoding unit 23 of the moving image encoding device in accordance with Embodiment 2 of the present invention. In FIG. 9, the same components as those shown in FIG. 1 or like components are designated by the same reference numerals as those shown in the figure, and the explanation of the components will be omitted hereafter. Further, because the structure of the moving image encoding device in accordance with this Embodiment 2 is the same as that in accordance with above-mentioned Embodiment 1, and the operation of each component except the variable length encoding unit 23 is the same as that in accordance with above-mentioned Embodiment 1, an explanation will be made by using FIGS. 1 to 8. Further, for the sake of simplicity, although it is assumed hereafter that the moving image encoding device in accordance with this Embodiment 2 has a structure and a processing method based on the use of the set of encoding modes shown in FIG. 2A, it is needless to say that Embodiment 2 can also be applied to a structure and a processing method based on the use of the set of encoding modes shown in FIG. 2B.

The variable length encoding unit 23 shown in FIG. 9 includes a binarization table memory 105 for storing a binarization table indicating a correspondence between index values which a multi valued signal showing an encoding mode 7 (or an optimum prediction parameter 10a or 18a, or an optimum compression parameter 20a) can have, and binary signals, a binarizing unit 92 for using this binarization table to convert an optimum encoding mode 7a (or an optimum prediction parameter 10a or 18a, or an optimum compression parameter 20a) shown by the multi valued signal which is selected by an encoding controlling unit 3 into a binary signal 103, an arithmetic encoding processing operation unit 104 for referring to context identification information 102 which is generated by a context generating unit 99, a context information memory 96, a probability table memory 97, and a state transition table memory 98 to carry out arithmetic encoding on the binary signal 103 into which the optimum encoding mode is converted by the binarizing unit 92 and output an encoded bit sequence 111, and for multiplexing this encoded bit sequence 111 into a bitstream 30, a frequency information generating unit 93 for counting the frequency of occurrence of the optimum encoding mode 7a (or an optimum prediction parameter 10a or 18a, or an optimum compression parameter 20a) to generate frequency information 94, and a binarization table updating unit 95 for updating the correspondence between possible values of the multi valued signal and binary signals in the binarization table stored in the binarization table memory 105 on the basis of the frequency information 94.

Hereafter, a variable length encoding procedure carried out by the variable length encoding unit 23 will be explained by taking the optimum encoding mode 7a of a macroblock outputted from the encoding controlling unit 3 as an example of a parameter to be entropy-encoded. An optimum prediction parameter 10a or 18a, or an optimum compression parameter 20a, which is similarly a parameter to be encoded, can be variable-length-encoded in accordance with the same procedure as that in accordance with which the variable length encoding unit encodes the optimum encoding mode 7a, the explanation of the procedure carried out on an optimum prediction parameter or an optimum compression parameter will be omitted hereafter.

The encoding controlling unit 3 in accordance with this Embodiment 2 outputs a context information initialization flag 91, a type indicating signal 100, peripheral block information 101, and a binarization table update flag 113. The details of each of the pieces of information will be mentioned later.

An initializing unit 90 initializes context information 106 stored in the context information memory 96 in accordance with the context information initialization flag 91 notified thereto from the encoding controlling unit 3 to place the context information 106 in its initial state. The details of the initialization process carried out by the initializing unit 90 will be mentioned later.

The binarizing unit 92 refers to the binarization table stored in the binarization table memory 105 to convert the index value of the multi valued signal showing the type of the optimum encoding mode 7a inputted thereto from the encoding controlling unit 3 into a binary signal 103, and outputs this binary signal to the arithmetic encoding processing operation unit 104.

FIG. 10 is a view showing an example of the binarization table held by the binarization table memory 105. In an "encoding mode" column shown in FIG. 10, there are five types of encoding modes 7 including a skip mode (mb_skip: a mode in which the decoding device uses a prediction image, on which the motion compensation has been carried out by using the motion vectors of adjacent macroblocks by the encoding device, for a decoded image) in addition to the encoding modes (mb_mode0 to mb_mode3) shown in FIG. 2A. An "index" value corresponding to each of the encoding modes is stored in the binarization table. Further, the index value of each of these encoding modes is binarized into a binary number having one or three bits, and is stored as a "binary signal". In this case, each bit of the binary signal is referred to as a "bin" number. Although mentioned later in detail, in the example of FIG. 10, a smaller index value is assigned to an encoding mode having a higher frequency of occurrence, and a corresponding binary signal is also set to be short in length, i.e. 1 bit in length.

The optimum encoding mode 7a outputted from the encoding controlling unit 3 is inputted to the binarizing unit 92, and is also inputted to the frequency information generating unit 93.

The frequency information generating unit 93 counts the frequency of occurrence of the index value of the encoding mode included in this optimum encoding mode 7a (the frequency of selection of the encoding mode which the encoding controlling unit has selected) to generate frequency information 94, and outputs this frequency information to the binarization table updating unit 95 which will be mentioned later.

The probability table memory 97 holds a table for storing two or more sets of one symbol (MPS: Most Probable Symbol) having a higher probability of occurrence of the symbol values "0" and "1" in each bin included in the binary signal 103, and the probability of occurrence of the symbol.

FIG. 11 is a view showing an example of a probability table held by the probability table memory 97. Referring to FIG. 11, a "probability table number" is assigned to each of discrete probability values ranging from 0.5 to 1.0 ("probabilities of occurrence").

The state transition table memory 98 holds a table for storing a plurality of sets each having a "probability table number" stored in the probability table memory 97, and a state transition from a probability state in which the MPS of "0" or "1", which is shown by the probability table number, has not been encoded to a probability state in which the MPS of "0" or "1" has been encoded.

FIG. 12 is a view showing an example of a state transition table held by the state transition table memory 98. Each set of a "probability table number", a "probability transition after LPS is encoded", and a "probability transition after MPS is encoded", which are shown in FIG. 12, corresponds to a probability table number shown in FIG. 11. For example, this figure shows that at the time of a probability state having the "probability table number 1" enclosed by a box shown in FIG. 12 (at the time that the probability of occurrence of the MPS is 0.527, as shown in FIG. 11), the encoding of one symbol having a lower probability of occurrence (LPS: Least Probable Symbol) of "0" and "1" causes the probability state to make a transition to the one having the probability table number 0 (the probability of occurrence of the MPS is 0.500, as shown in FIG. 11), as can be seen from the "probability transition after LPS is encoded". More specifically, because the LPS occurs, the probability of occurrence of the MPS becomes small. In contrast with this, the figure shows that the encoding of the MPS causes the probability state to make a transition to the one having the probability table number 2 (the probability of occurrence of the MPS is 0.550, as shown in FIG. 11), as can be seen from the "probability transition after MPS is encoded". More specifically, because the MPS occurs, the probability of occurrence of the MPS becomes large.

The context generating unit 99 refers to the type indicating signal 100 indicating the type of the parameter to be encoded (the optimum encoding mode 7a, an optimum prediction parameter 10a or 18a, or an optimum compression parameter 20a) which is inputted from the encoding controlling unit 3, and the peripheral block information 101 to generate context identification information 102 for each bin of the binary signal 103 acquired by carrying out binarization on the parameter to be encoded. In this explanation, the type indicating signal 100 indicates the optimum encoding mode 7a of the macroblock to be encoded. Further, the peripheral block information 101 indicates the optimum encoding modes 7a of macroblocks adjacent to the macroblock to be encoded. Hereafter, a generation procedure for generating the context identification information which is carried out the context generating unit 99 will be explained.

Figure 13:
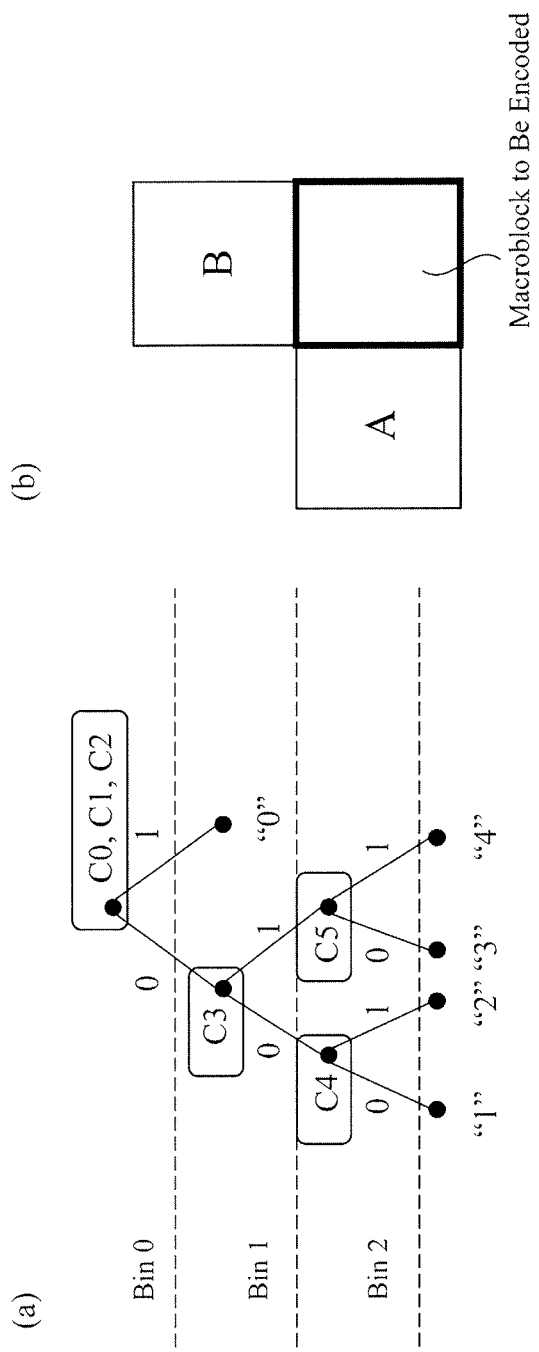
FIG. 13 is a view explaining a procedure of generating context identification information.

FIG. 13(a) is a view showing the binarization table shown in FIG. 10 in binary tree representation. Hereafter, an explanation will be made by taking a macroblock to be encoded denoted by a thick-bordered box shown in FIG. 13(b) and peripheral blocks A and B which are adjacent to this macroblock to be encoded as an example. In FIG. 13(a), each black dot is referred to as a node, and each line which connects between nodes is referred to as a path. The indexes of the multi valued signal to be binarized are assigned to the terminal nodes of the binary tree, respectively. Further, the position of each node in a direction of the depth of the binary tree, which is extending downwardly from an upper part to a lower part on the page, corresponds to its bin number, and a bit sequence which is acquired by connecting the symbols (each 0 or 1) respectively assigned to paths extending from the root node to each terminal node shows a binary signal 103 corresponding to the index of the multi valued signal assigned to the terminal node. For each parent node (a node which is not any terminal node) of the binary tree, one or more pieces of context identification information are prepared in accordance with the information about the peripheral blocks A and B.

For example, when three pieces of context identification information C0, C1, and C2 are prepared for the root node in the example of FIG. 13(a), the context generating unit 99 refers to the pieces of peripheral block information 101 about the adjacent peripheral blocks A and B to select either one of the three pieces of context identification information C0, C1, and C2 in accordance with the following equation (4). The context generating unit 99 outputs the selected context identification information as the context identification information 102.

$$\Gamma(X) = \begin{cases} 0 & \text{(when encoding mode of macroblock } X \text{ is not zero)} \\ 1 & \text{(when encoding mode of macroblock } X \text{ is zero)} \end{cases} \quad (4)$$

$$\begin{cases} C0 : \Gamma(A) + \Gamma(B) = 0 \\ C1 : \Gamma(A) + \Gamma(B) = 1 \\ C2 : \Gamma(A) + \Gamma(B) = 2 \end{cases}$$

The above equation (4) is prepared on the assumption that when each of the peripheral blocks A and B is defined as a macroblock X, there is a high probability that the encoding mode of the macroblock to be encoded is "0" (mb_skip) when the encoding mode of each of the peripheral blocks A and B is "0" (mb_skip). Therefore, the context identification information 102 selected in accordance with the above equation (4) is based on the same assumption.

One context identification information (C3, C4, or C5) is assigned to each of the parent nodes other than the root node.

The context information identified by the context identification information 102 holds the value (0 or 1) of the MPS and the probability table number which approximates the probability of occurrence of the value. Now, the context information is placed in its initial state. The context information memory 96 stores this context information.

The arithmetic encoding processing operation unit 104 carries out arithmetic encoding on each bin of the binary signal 103 with one or three bits inputted from the binarizing unit 92 to generate an encoded bit sequence 111, and multiplexes this encoded bit sequence into the bitstream 30. Hereafter, an arithmetic encoding procedure based on the context information will be explained.

The arithmetic encoding processing operation unit 104 refers to the context information memory 96 first to acquire the context information 106 based on the context identification information 102 corresponding to the bin 0 of the binary signal 103. Next, the arithmetic encoding processing operation unit 104 refers to the probability table memory 97 to specify the probability 108 of occurrence of the MPS of the bin 0 corresponding to the probability table number 107 held by the context information 106.

Next, the arithmetic encoding processing operation unit 104 carries out arithmetic encoding on the symbol value 109 (0 or 1) of the bin 0 on the basis of the value (0 or 1) of the MPS held by the context information 106 and the specified probability 108 of occurrence of the MPS. Next, the arithmetic encoding processing operation unit 104 refers to the state transition table memory 98 and acquires the probability table number 110 at a time after the symbol of the bin 0 is encoded on the basis of both the probability table number 107 held by the context information 106, and the symbol value 109 of the bin 0 on which arithmetic encoding has been carried out previously.

Next, the arithmetic encoding processing operation unit 104 updates the value of the probability table number (i.e. the probability table number 107) of the context information 106 of the bin 0 stored in the context information memory 96 to the probability table number at a time after the state transition (i.e. the probability table number 110 at a time after the symbol of the bin 0 is encoded, which has been previously acquired from the state transition table memory 98).

The arithmetic encoding processing operation unit 104 also carries out arithmetic encoding based on the context information 106 identified by the context identification information 102 on the symbol of each of the bins 1 and 2, and then updates the context information 106 after encoding the symbol of each of the bins, like in the case of carrying out arithmetic encoding on the symbol of the bin 0. The arithmetic encoding processing operation unit 104 outputs an encoded bit sequence 111 which the arithmetic encoding processing operation unit has acquired by carrying out arithmetic encoding on the symbols of all the bins, and the variable length encoding unit 23 multiplexes the encoded bit sequence into the bitstream 30.

As mentioned above, the context information 106 identified by the context identification information 102 is updated every time when arithmetic encoding is carried out on the symbol of each bin. More specifically, this update means that the probability state of each node makes a transition every time when the symbol of each bin is encoded. Initialization of the context information 106, i.e. reset of the probability state is carried out by the above-mentioned initializing unit 90. While the initializing unit 90 initializes the context information in accordance with an instruction shown by the context information initialization flag 91 of the encoding controlling unit 3, the initializing unit 90 carries out this initialization at the head of each slice or the like. A plurality of sets can be prepared in advance for the initial state of each context information 106 (the value of the MPS, and the initial value of the probability table number which approximates the probability of occurrence of the value), and the encoding controlling unit 3 can include information showing which initial state is to be selected from the plurality of sets in the context information initialization flag 91 and notify this context information initialization flag to the initializing unit 90.

The binarization table updating unit 95 refers to the frequency information 94 showing the frequency of occurrence of the index value of the parameter to be encoded (in this case, the optimum encoding mode 7a) which is generated by the frequency information generating unit 93 on the basis of the binarization table update flag 113 notified thereto from the encoding controlling unit 3 to update the binarization table memory 105. Hereafter, a procedure for updating the binarization table which is carried out by the binarization table updating unit 95 will be explained.

In this example, the binarization table updating unit updates a correspondence between the encoding modes in the binarization table and the indexes in accordance with the frequency of occurrence of the encoding mode specified by the optimum encoding mode 7a which is the parameter to be encoded in such a way as to be able to binarize the encoding mode having the highest frequency of occurrence into a short codeword, thereby reducing the code amount.

FIG. 14 is a view showing an example of the binarization table updated. Assuming that the binarization table which is yet to be updated is placed in a state shown in FIG. 10, FIG. 14 shows a state in which the binarization table has been updated. For example, when the frequency of occurrence of mb_mode3 is the highest, the binarization table updating unit 95 assigns the smallest index value to mb_mode3 in accordance with the frequency information 94 in such a way that a binary signal having a short codeword is assigned to mb_mode3.

Further, after updating the binarization table, the binarization table updating unit 95 needs to generate binarization table update identification information 112 for enabling the decoding device to identify the updated binarization table and multiplex the binarization table update identification information into the bitstream 30. For example, when there are a plurality of binarization tables for each parameter to be encoded, an ID for enabling the identification of each parameter to be encoded can be provided in advance for both the encoding device and the decoding device, and the binarization table updating unit 95 can be constructed in such a way as to output the ID of the binarization table updated as binarization table updating identification information 112, and multiplex this binarization table update identification information into the bitstream 30.

The encoding controlling unit 3 carries out control of an update time by referring to the frequency information 94 of the parameter to be encoded at the head of each slice, and, when determining that the distribution of the frequency of occurrence of the parameter to be encoded has changed and deviated from a predetermined permissible range, outputting a binarization table update flag 113. The variable length encoding unit 23 should just multiplex the binarization table update flag 113 into the slice header of the bitstream 30. Further, when the binarization table update flag 113 shows "there is an update of the binarization table", the variable length encoding unit 23 multiplexes the binarization table updating identification information 112 showing which binarization table of the binarization tables of the encoding mode, a compression parameter, and a prediction parameter has been updated into the bitstream 30.

Further, the encoding controlling unit 3 can notify the update of the binarization table at a time other than the time that the encoding controlling unit processes the head of each slice. For example, the encoding controlling unit can output the binarization table update flag 113 at the time that the encoding controlling unit processes the head of an arbitrary macroblock to instruct an update of the binarization table. In this case, the binarization table updating unit 95 needs to output information for identifying the position of the macroblock for which the binarization table has been updated, and the variable length encoding unit 23 also needs to multiplex the information into the bitstream 30.

When outputting the binarization table update flag 113 to the binarization table updating unit 95 to cause this binarization table updating unit to update the binarization table, the encoding controlling unit 3 needs to output the context information initialization flag 91 to the initializing unit 90 to cause the initializing unit to initialize the context information memory 96.

Figure 15:
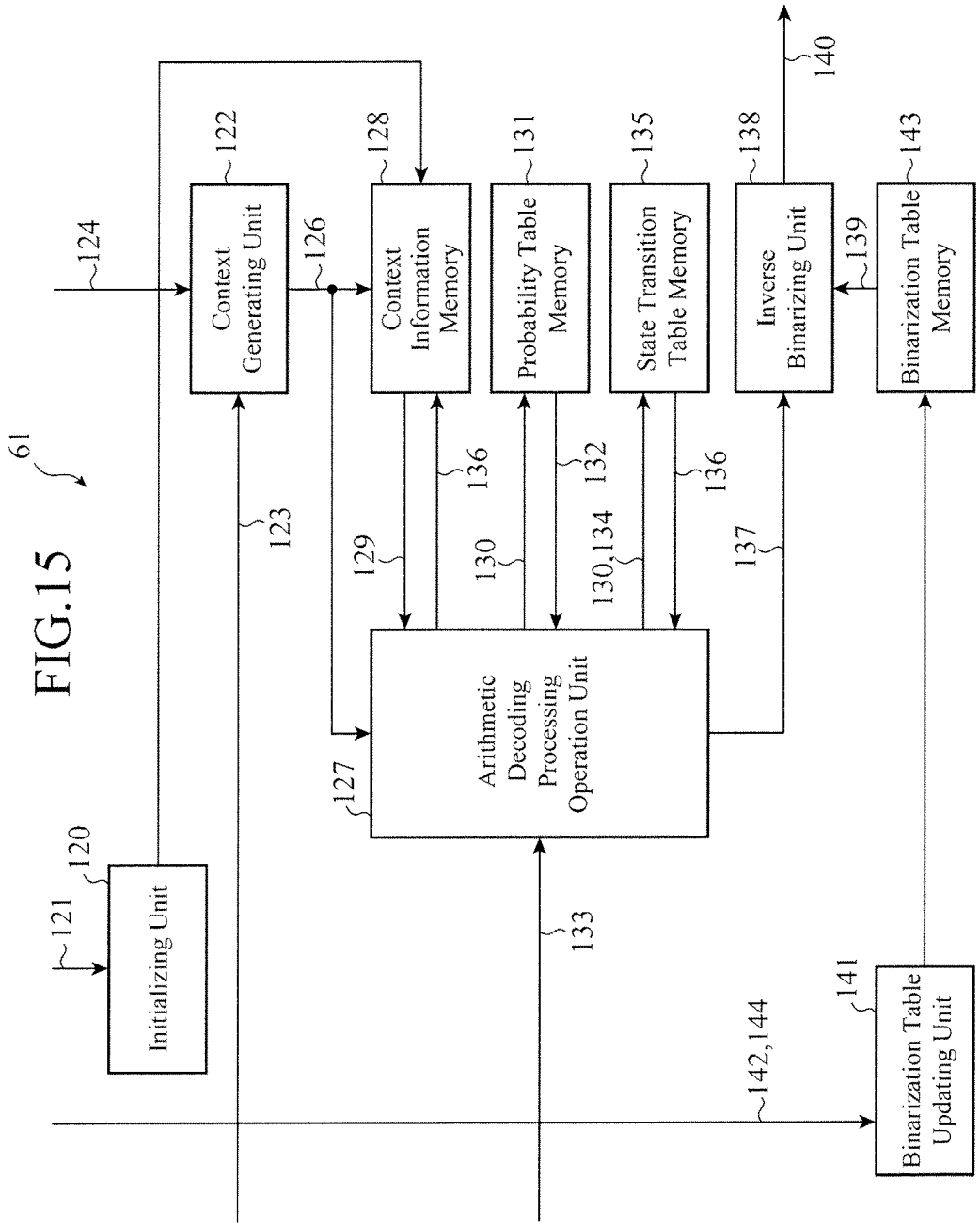
FIG. 15 is a block diagram showing the internal structure of a variable length decoding unit of a moving image decoding device in accordance with Embodiment 2 of the present invention.

Next, a variable length decoding unit 61 of the moving image decoding device in accordance with this Embodiment 2 will be explained. FIG. 15 is a block diagram showing the internal structure of the variable length decoding unit 61 of the moving image decoding device in accordance with Embodiment 2 of the present invention. Further, because the structure of the moving image decoding device in accordance with this Embodiment 2 is the same as that in accordance with above-mentioned Embodiment 1, and the operation of each component except the variable length decoding unit 61 is the same as that in accordance with above-mentioned Embodiment 1, an explanation will be made by using FIGS. 1 to 8.

The variable length decoding unit 61 shown in FIG. 15 includes an arithmetic decoding processing operation unit 127 for referring to context identification information 126 which a context generating unit 122 generates, a context information memory 128, a probability table memory 131, and a state transition table memory 135 to carry out arithmetic decoding on an encoded bit sequence 133 showing an optimum encoding mode 62 (or an optimum prediction parameter 63 or an optimum compression parameter 65) multiplexed into a bitstream 60 to generate a binary signal 137, a binarization table memory 143 for storing a binarization table 139 indicating a correspondence between the optimum encoding mode 62 expressed by a binary signal (or an optimum prediction parameter 63 or an optimum compression parameter 65) and a multi valued signal, and an inverse binarizing unit 138 for converting the binary signal 137 which the arithmetic decoding processing operation unit 127 has generated into a decoded value 140 of a multi valued signal by using the binarization table 139.

Hereafter, a variable length decoding procedure carried out by the variable length decoding unit 61 will be explained by taking the optimum encoding mode 62 of a macroblock included in the bitstream 60 as an example of a parameter to be entropy-decoded. Because the variable length decoding unit 61 can also variable-length-decode an optimum prediction parameter 63 or an optimum compression parameter 65 which is similarly a parameter to be decoded in accordance with the same procedure as that in accordance with which the variable length decoding unit variable-length-decodes the optimum encoding mode 62, the explanation of the variable length decoding procedure carried out on an optimum prediction parameter or an optimum compression parameter will be omitted.

Context initialization information 121, an encoded bit sequence 133, a binarization table update flag 142, and binarization table updating identification information 144 which are multiplexed into the bitstream 60 by the encoding device are included in the bitstream 60 in accordance with this Embodiment 2. The details of each of these pieces of information will be mentioned later.

An initializing unit 120 initializes the context information stored in the context information memory 128 at the head of each slice or the like. As an alternative, a plurality of sets can be prepared for an initial state of the context information (the value of the MPS, and an initial value of the probability table number which approximates the probability of occurrence of the MPS value) in the initializing unit 120, and an initial state corresponding to the decoded value of the context initialization information 121 can be selected from the plurality of sets.

The context generating unit 122 refers to both a type indicating signal 123 showing the type of the parameter to be decoded (the optimum encoding mode 62, an optimum prediction parameter 63, or an optimum compression parameter 65) and peripheral block information 124 to generate context identification information 126.

The type indicating signal 123 shows the type of the parameter to be decoded, and the decoding device determines what the parameter to be decoded is in accordance with a syntax held by the variable length decoding unit 61. Therefore, the encoding device and the decoding device need to hold the same syntax, and, in this embodiment, it is assumed that the encoding controlling unit 3 of the encoding device holds the syntax. The encoding device sequentially outputs the type of the parameter to be encoded next and the value (index value) of the parameter, i.e. the type indicating signal 100 to the variable length encoding unit 23 in accordance with the syntax held by the encoding controlling unit 3.

Further, the peripheral block information 124 includes the encoding mode which is acquired by decoding each macroblock or subblock, and is stored in a memory (not shown) in the variable length decoding unit 61 in order to use the peripheral block information 124 as information used for subsequent decoding of a macroblock or subblock and is outputted to the context generating unit 122 as needed.

A generation procedure for generating context identification information 126 which is carried out by the context generating unit 122 is the same as the operation of the context generating unit 99 disposed in the encoding device. Also the context generating unit 122 in the decoding device generates context identification information 126 for each bin of the binarization table 139 which is to be referred to by the inverse binarizing unit 138.

In the context information of each bin, the value (0 or 1) of the MPS, and the probability table number for specifying the probability of occurrence of the value of the MPS are held as probability information used for carrying out arithmetic decoding on the bin. Further, the probability table memory 131 and the state transition table memory 135 store the same probability table (FIG. 11) as the probability table memory 97 of the encoding device and the same state transition table (FIG. 12) as the state transition table memory 98 of the encoding device, respectively.

The arithmetic decoding processing operation unit 127 carries out arithmetic decoding on the encoded bit sequence 133 multiplexed into the bitstream 60 on a per-bin basis to generate a binary signal 137, and outputs this binary signal to the inverse binarizing unit 138.

The arithmetic decoding processing operation unit 127 refers to the context information memory 128 first to acquire the context information 129 based on the context identification information 126 corresponding to each bin of the encoded bit sequence 133. Next, the arithmetic decoding processing operation unit 127 refers to the probability table memory 131 to specify the probability 132 of occurrence of the MPS of each bin corresponding to the probability table number 130 held by the context information 129.

The arithmetic decoding processing operation unit 127 then carries out arithmetic decoding on the encoded bit sequence 133 inputted to the arithmetic decoding processing operation unit 127 on the basis of the value (0 or 1) of the MPS held by the context information 129 and the specified probability 132 of occurrence of the MPS to acquire the symbol value 134 (0 or 1) of each bin. After acquiring the symbol value of each bin through the decoding, the arithmetic decoding processing operation unit 127 refers to the state transition table memory 135, and acquires the probability table number 136 at a time after the symbol of each bin is decoded (at a time after a state transition is made) on the basis of the symbol value 134 of each decoded bin and the probability table number 130 held by the context information 129 and in accordance with the same procedure as that carried out by the arithmetic encoding processing operation unit 104 of the encoding device.

Next, the arithmetic decoding processing operation unit 127 updates the value of the probability table number (i.e. the probability table number 130) of the context information 129 of each bin which is stored in the context information memory 128 to the probability table number at a time after a state transition is made (i.e. the probability table number 136 at a time after the symbol of each bin is decoded which has been previously acquired from the state transition table memory 135). The arithmetic decoding processing operation unit 127 outputs a binary signal 137 in which the symbols of the bins acquired as results of performing the above-mentioned arithmetic decoding on the encoded bit sequence are connected to one another to the inverse binarizing unit 138.

The inverse binarizing unit 138 selects the same binarization table 139 as that used at the time of the encoding from among the binarization tables stored in the binarization table memory 143 and prepared for all the types of parameters to be decoded and refers to the binarization table selected thereby, and selectively outputs the decoded value 140 of the parameter to be decoded from the binary signal 137 inputted thereto from the arithmetic decoding processing operation unit 127. When the type of the parameter to be decoded is the encoding mode (optimum encoding mode 62) of a macroblock, the binarization table 139 is the same as the binarization table in the encoding device shown in FIG. 10.

The binarization table updating unit 141 updates the binarization table stored in the binarization table memory 143 on the basis of the binarization table update flag 142 and the binarization table updating identification information 144 which are decoded from the bitstream 60.

The binarization table update flag 142 is information which corresponds to the binarization table update flag 113 in the encoding device, and which is included in the header information or the like of the bitstream 60 and shows whether or not there is an update to the binarization table. When the decoded value of the binarization table update flag 142 shows "there is an update to the binarization table", the binarization table updating identification information 144 is decoded from the bitstream 60.

The binarization table updating identification information 144 is information which corresponds to the binarization table updating identification information 112 in the encoding device, and which is used for identifying the binarization table of a parameter updated by the encoding device. For example, when a plurality of binarization tables are provided in advance for each parameter to be encoded, as mentioned above, an ID which enables each parameter to be encoded to be identified and an ID of each of the binarization tables are provided in advance both in the encoding device side and in the decoding device, and the binarization table updating unit 141 updates the binarization table corresponding to the ID value in the binarization table updating identification information 144 which is decoded from the bitstream 60. In this example, two types of binarization tables shown in FIGS. 10 and 14, and IDs of these binarization tables are prepared in advance in the binarization table memory 143, and, when it is assumed that the binarization table yet to be updated is placed in a state shown in FIG. 10, the binarization table updating unit 141 must necessarily select the binarization table corresponding to the ID included in the binarization table updating identification information 144 by simply carrying out an update process in accordance with the binarization table update flag 142 and the binarization table updating identification information 144. Therefore, the binarization table updated enters a state shown in FIG. 14, and becomes the same as the binarization table which has been updated in the encoding device.

As mentioned above, the moving image encoding device in accordance with Embodiment 2 is constructed in such a way that the encoding controlling unit 3 selects and outputs a parameter to be encoded, such as an optimum encoding mode 7a which provides an optimum degree of encoding efficiency, an optimum prediction parameter 10a or 18a, or an optimum compression parameter 20a, the binarizing unit 92 of the variable length encoding unit 23 converts the parameter to be encoded expressed by a multi valued signal into a binary signal 103 by using the binarization table stored in the binarization table memory 105, the arithmetic encoding processing operation unit 104 carries out arithmetic encoding on the binary signal 103 to output an encoded bit sequence 111, the frequency information generating unit 93 generates frequency information 94 of the parameter to be encoded, and the binarization table updating unit 95 updates the correspondence between the multi valued signal in the binarization table and the binary signal on the basis of the frequency information 94, the code amount can be reduced while the encoded video having the same quality is generated, as compared with the conventional method having the binarization table which is fixed at all times.

Further, because the binarization table updating unit 95 is constructed in such a way as to multiplex both the binarization table updating identification information 112 showing whether or not there is an update to the binarization table, and the binarization table updating identification information 112 for identifying the binarization table updated into the bitstream 30, the moving image decoding device in accordance with Embodiment 2 is constructed in accordance with the structure of the binarization table updating unit in such a way that the arithmetic decoding processing operation unit 127 of the variable length decoding unit 61 carries out arithmetic decoding on the encoded bit sequence 133 multiplexed into the bitstream 60 to generate a binary signal 137, the inverse binarizing unit 138 uses the binarization table 139 of the binarization table memory 143 to convert the binary signal 137 into a multi valued signal and acquire a decoded value 140, and the binarization table updating unit 141 updates a predetermined binarization table stored in the binarization table memory 143 on the basis of the binarization table update flag 142 and the binarization table updating identification information 144 which are acquired through the decoding of the header information multiplexed into the bitstream 60. Therefore, because the moving image decoding device can update the binarization table in accordance with the same procedure as that carried out by the moving image encoding device and can carry out inverse binarization on the parameter to be encoded, the moving image encoding device in accordance with Embodiment 2 can decode the encoded bitstream correctly.

Embodiment 3.

In this Embodiment 3, a variant of the generating process of generating a prediction image by using a motion-compensated prediction which is made by the motion-compensated prediction unit 9 in the moving image encoding device and the moving image decoding device in accordance with any one of above-mentioned Embodiments 1 and 2 will be explained First, a motion-compensated prediction unit 9 of a moving image encoding device in accordance with this Embodiment 3 will be explained. Further, because the structure of the moving image encoding device in accordance with this Embodiment 3 is the same as that in accordance with above-mentioned Embodiment 1 or 2, and the operation of each component except the motion-compensated prediction unit 9 is the same as that in accordance with above-mentioned Embodiment 1 or 2, an explanation will be made by using FIGS. 1 to 15.

The motion-compensated prediction unit 9 in accordance with this Embodiment 3 has the same structure as and operates in the same way as that in accordance with above-mentioned Embodiment 1 or 2, with the exception that a structure and an operation associated with a prediction image generating process having virtual sample accuracy differ from those in accordance with any one of above-mentioned Embodiments 1 and 2. More specifically, in accordance with above-mentioned Embodiments 1 and 2, as shown in FIG. 3, the interpolated image generating unit 43 of the motion-compensated prediction unit 9 generates reference image data having virtual pixel accuracy, such as half-pixel or ¼ pixel accuracy, and, when generating a prediction image 45 on the basis of this reference image data having virtual pixel accuracy, generates virtual pixels by implementing an interpolation arithmetic operation with a 6-tap filter using six integer pixels running in a vertical or horizontal direction to generate a prediction image, like in the case of the MPEG-4 AVC standards. In contrast with this, the motion-compensated prediction unit 9 in accordance with this Embodiment 3 enlarges a reference image 15 having integer pixel accuracy stored in a motion-compensated prediction frame memory 14 by carrying out a super resolution process on the reference image 15 to generate a reference image 207 having virtual pixel accuracy, and then generates a prediction image on the basis of this reference image 207 having virtual pixel accuracy.

Next, the motion-compensated prediction unit 9 in accordance with this Embodiment 3 will be explained by using FIG. 3. Like that in accordance with any one of above-mentioned Embodiments 1 and 2, an interpolated image generating unit 43 in accordance with this Embodiment 3 specifies one or more frames of reference images 15 from the motion-compensated prediction frame memory 14, and a motion detecting unit 42 detects a motion vector 44 in a predetermined motion search range on the reference image 15 specified by the interpolated image generating unit. The detection of the motion vector is implemented by using a motion vector having virtual pixel accuracy, like in the case of the MPEG-4 AVC standards or the like. In accordance with this detecting method, an interpolation arithmetic operation is performed on pixel information (referred to as integer pixels) which the reference image has to generate virtual samples (pixels) between the integer pixels, and these virtual samples are used as a reference image.

In order to generate a reference image having virtual pixel accuracy, it is necessary to enlarge a reference image having integer pixel accuracy (generate a reference image having a higher resolution) to generate a sample plane which consists of virtual pixels. To this end, when a reference image for movement search having virtual pixel accuracy is required, the interpolated image generating unit 43 in accordance with this Embodiment 3 uses a super resolution technique disclosed by "W. T. Freeman, E. C. Pasztor and O. T. Carmichael, "Learning Low-Level Vision", International Journal of Computer Vision, vol. 40, No. 1, 2000" to generate a reference image having virtual pixel accuracy. In the following explanation, a structure in which the motion-compensated prediction unit 9 carries out a super resolution image generating process to generate a reference image 207 having virtual pixel accuracy from the reference image data stored in the motion-compensated prediction frame memory 14, and the motion detecting unit 42 carries out a motion vector search process using the reference image will be mentioned hereafter.

Figure 16:
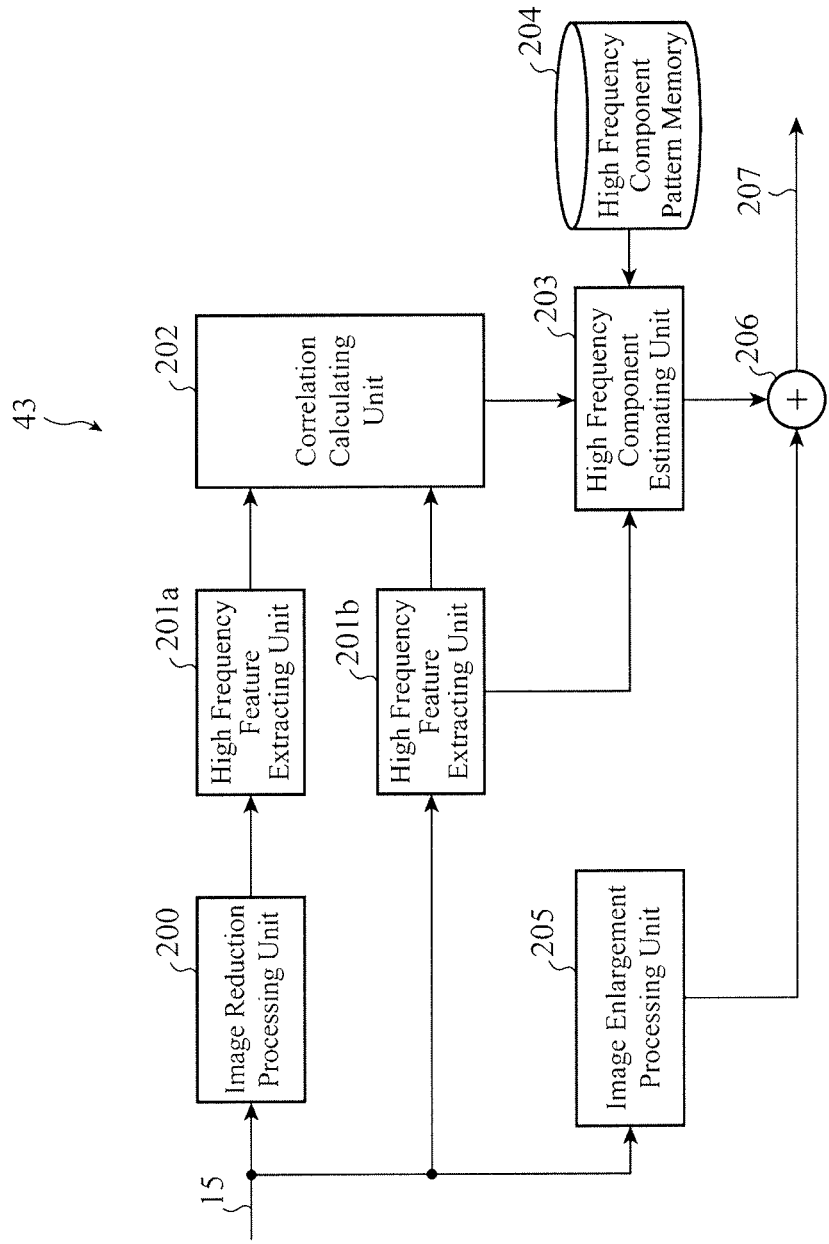
FIG. 16 is a block diagram showing the internal structure of an interpolated image generating unit with which a motion-compensated prediction unit of a moving image encoding device in accordance with Embodiment 3 of the present invention is provided.

FIG. 16 is a block diagram showing the internal structure of the interpolated image generating unit 43 of the motion-compensated prediction unit 9 of the moving image encoding device in accordance with Embodiment 3 of the present invention. The interpolated image generating unit 43 shown in FIG. 16 includes an image enlargement processing unit 205 for carrying out an enlarging process on the reference image 15 stored in the motion-compensated prediction frame memory 14, an image reduction processing unit 200 for carrying out a reducing process on the reference image 15, a high frequency feature extracting unit 201*a* for extracting a feature quantity of a high frequency region component from the image reduction processing unit 200, a high frequency feature extracting unit 201*b* for extracting a feature quantity of a high frequency region component from the reference image 15, a correlation calculating unit 202 for calculating the value of a correlation between the feature quantities, a high frequency component estimating unit 203 for estimating a high frequency component from both the value of the correlation and prior learned data stored in a high frequency component pattern memory 204, and an adding unit 206 for correcting a high frequency component of the enlarged image by using the estimated high frequency component to generate a reference image 207 having virtual pixel accuracy.

In the interpolated image generating unit shown in FIG. 16, when the reference image 15 in the range used for a motion search process is inputted from the reference image data stored in the motion-compensated prediction frame memory 14 to the interpolated image generating unit 43, this reference image 15 is inputted to the image reduction processing unit 200, to the high frequency feature extracting unit 201*b*, and to the image enlargement processing unit 205.

The image reduction processing unit 200 generates a reduced image whose height and width are respectively reduced to 1/N times (N is a power of 2, such as 2 or 4) the original height and width from the reference image 15, and outputs the reduced image to the high frequency feature extracting unit 201*a*. A typical image reduction filter implements this reducing process.

The high frequency feature extracting unit 201*a* extracts a first feature quantity associated with a high frequency component, such as an edge component, from the reduced image which is generated by the image reduction processing unit 200. As the first feature quantity, for example, a parameter showing a DCT in a local block or a Wavelet transform coefficient distribution can be used.

The high frequency feature extracting unit 201*b* carries out a high frequency feature extracting process similar to that carried out by the high frequency feature extracting unit 201*a*, and extracts a second feature quantity having a frequency component region different from that of the first feature quantity from the reference image 15. The second feature quantity is outputted to the correlation calculating unit 202, and is also outputted to the high frequency component estimating unit 203.

When the first feature quantity is inputted from the high frequency feature extracting unit 201*a* and the second feature quantity is inputted from the high frequency feature extracting unit 201*b*, the correlation calculating unit 202 calculates the value of a feature-quantity-based correlation in a high frequency component region between the reference image 15 and the reduced image in units of one local block. As this value of the correlation, for example, a distance between the first feature quantity and the second feature quantity is calculated.

The high frequency component estimating unit 203 specifies a prior learned pattern of the high frequency component from the high frequency component pattern memory 204 on the basis of both the second feature quantity inputted thereto from the high frequency feature extracting unit 201*b*, and the value of the correlation inputted thereto from the correlation calculating unit 202, and estimates and generates a high frequency component which the reference image 207 having virtual pixel accuracy should have. The generated high frequency component is outputted to the adding unit 206.

The image enlargement processing unit 205 performs either an interpolation arithmetic operation with a 6-tap filter using six integer pixels running in a vertical or horizontal direction or enlargement filtering, such as bilinear filtering, on the inputted reference image 15, like in the case of performing a generating process of generating samples having half pixel accuracy in accordance with the MPEG-4 AVC standards, to enlarge each of the height and width of the reference image 15 by N times to generate an enlarged image.

The adding unit 206 adds the high frequency component inputted thereto from the high frequency component estimating unit 203 to the enlarged image inputted thereto from the image enlargement processing unit 205 to generate an enlarged reference image. More specifically, the adding unit corrects the high frequency component of the enlarged image to generate an enlarged reference image whose height and width are respectively enlarged to N times the original height and width. The interpolated image generating unit 43 uses this enlarged reference image data as a reference image 207 having virtual pixel accuracy in which 1/N is set to 1.

The interpolated image generating unit 43 can be alternatively constructed in such a way as to, after generating a reference image 207 having half pixel (½ pixel) accuracy by setting N to 2, generate virtual samples (pixels) having ¼ pixel accuracy by performing an interpolation arithmetic operation using a filter for acquiring a mean value of adjacent ½ pixels or integer pixels.

Further, the interpolated image generating unit 43 can be constructed in such a way as to include a unit for switching whether or not to add the high frequency component outputted by the high frequency component estimating unit 203 to the enlarged image outputted by the image enlargement processing unit 205 to control the result of the generation of the reference image 207 having virtual pixel accuracy in addition to the structure shown in FIG. 16. In the case in which the interpolated image generating unit is constructed in this way, there is provided an advantage of suppressing a bad influence upon the encoding efficiency when the estimation accuracy of the high frequency component estimating unit 203 is bad for some reason such as an exceptional image pattern. When the adding unit 206 selectively determines whether or not to add the high frequency component outputted by the high frequency component estimating unit 203 to the enlarged image, the moving image encoding device generates a prediction image 45 for both the case of adding them and the case of not adding them and then carries out a motion-compensated prediction, and encodes the results of the motion-compensated prediction and determines one of the prediction images which provides a higher degree of efficiency. The moving image encoding device then multiplexes adding process information showing whether the adding unit has added the high frequency component to the enlarged image into the bitstream 30 as control information.

As an alternative, the interpolated image generating unit 43 can uniquely determine whether or not to add the high frequency component to the enlarged image from another parameter to be multiplexed into the bitstream 30 to control the adding process carried out by the adding unit 206. As an example of determining whether or not to add the high frequency component to the enlarged image from another parameter, for example, there can be provided a method of using the type of an encoding mode 7 as shown in FIG. 2A or 2B. When an encoding mode showing that the division of a macroblock into motion compensation region blocks is fine is selected, there is a high probability that the image pattern has a violent movement. Therefore, in this case, by assuming that the effect of the super resolution is low, the interpolated image generating unit 43 controls the adding unit 206 to cause this adding unit not to add the high frequency component outputted by the high frequency component estimating unit 203 to the enlarged image. In contrast, when either an encoding mode showing that the size of each motion compensation region block in a macroblock is large or an intra prediction mode in which the block size is large is selected, there is a high probability that the image pattern is a relatively-stationary image area. Therefore, in this case, by assuming that the effect of the super resolution is low, the interpolated image generating unit 43 controls the adding unit 206 to cause this adding unit to add the high frequency component outputted by the high frequency component estimating unit 203 to the enlarged image.

As an example of using another parameter other than the encoding mode 7, a parameter, such as the size of the motion vector or a variation in the motion vector field in consideration of adjacent areas, can be used. The interpolated image generating unit 43 of the motion-compensated prediction unit 9 shares the type of the parameter with the decoding device to determine whether or not to add the high frequency component to the enlarged image. In this case, the moving image encoding device does not have to multiplex the control information about the adding process directly into the bitstream 30, thereby being able to improve the compression efficiency.

The moving image encoding device can be constructed in such a way as to perform the above-mentioned super resolution process on the reference image 15, which is to be stored in the motion-compensated prediction frame memory 14, to convert the reference image into a reference image 207 having virtual pixel accuracy before storing the reference image in the motion-compensated prediction frame memory 14, and, after that, store the reference image 207 in the motion-compensated prediction frame memory. In the case of this structure, although the size of a memory required as the motion-compensated prediction frame memory 14 increases, the moving image encoding device does not have to sequentially carry out the super resolution process during the motion vector search and during the prediction image generation and the processing load on the motion-compensated prediction process itself can be reduced, and the moving image encoding device becomes able to carry out the frame encoding process and the generating process of generating a reference image 207 having virtual pixel accuracy in parallel, and can speed up the processes.

Hereafter, an example of a motion vector detection procedure for detecting a motion vector having virtual pixel accuracy using the reference image 207 having virtual pixel accuracy will be shown by using FIG. 3.

Motion Vector Detection Procedure I'

The interpolated image generating unit 43 generates a prediction image 45 for the motion vector 44 having integer pixel accuracy in the predetermined motion search range of a motion compensation region block image 41. The prediction image 45 (prediction image 17) generated at integer pixel accuracy is outputted to the subtraction unit 12, and is subtracted from the motion compensation region block image 41 (macro/subblock image 5) by the subtraction unit 12, so that the result of the subtraction is defined as a prediction difference signal 13. The encoding controlling unit 3 evaluates a degree of prediction efficiency for the prediction difference signal 13 and for the motion vector 44 (prediction parameter 18) having integer pixel accuracy. Because the evaluation of this prediction efficiency can be carried out in accordance with the above equation (1) explained in above-mentioned Embodiment 1, the explanation of the evaluation will be omitted hereafter.

Motion Vector Detection Procedure II'

The interpolated image generating unit 43 generates a prediction image 45 by using the reference image 207 having virtual pixel accuracy generated within the interpolated image generating unit 43 shown in FIG. 16 for a motion vector 44 having ½ pixel accuracy located in the vicinity of the motion vector having integer pixel accuracy which is determined in accordance with the above-mentioned "motion vector detection procedure I". After that, like in the case of the above-mentioned "motion vector detection procedure I", the prediction image 45 (prediction image 17) generated at ½ pixel accuracy is subtracted from the motion compensation region block image 41 (macro/subblock image 5) by the subtraction unit 12 to acquire a prediction difference signal 13. Next, the encoding controlling unit 3 evaluates a degree of prediction efficiency for this prediction difference signal 13 and for the motion vector 44 (prediction parameter 18) having ½ pixel accuracy, and selectively determines a motion vector 44 having ½ pixel accuracy which minimizes the prediction cost $J_1$ from among one or more motion vectors having ½ pixel accuracy located in the vicinity of the motion vector having integer pixel accuracy.

Motion Vector Detection Procedure III'

Also as to a motion vector having ¼ pixel accuracy, the encoding controlling unit 3 and the motion-compensated prediction unit 9 selectively determine a motion vector 44 having ¼ pixel accuracy which minimizes the prediction cost $J_1$ from one or more motion vectors having ¼ pixel accuracy located in the vicinity of the motion vector having ½ pixel accuracy which is determined in accordance with the above-mentioned "motion vector detection procedure II".

Motion Vector Detection Procedure IV'

After that, the encoding controlling unit 3 and the motion-compensated prediction unit 9 similarly detect a motion vector having virtual pixel accuracy until the motion vector detected thereby has a predetermined degree of accuracy.

Thus, the motion-compensated prediction unit 9 outputs the virtual-pixel-accuracy motion vector having the predetermined accuracy, which is determined for each motion compensation region block image 41 which is one of a plurality of blocks into which the macro/subblock image 5 is divided and each of which is a unit for the motion compensation shown by the encoding mode 7, and the identification number of the reference image specified by the motion vector as prediction parameters 18. The motion-compensated prediction unit 9 also outputs the prediction image 45 (prediction image 17) which is generated by using the prediction parameters 18 to the subtraction unit 12, and the subtraction unit 12 subtracts the prediction image 45 from the macro/subblock image 5 to acquire a prediction difference signal 13. The prediction difference signal 13 outputted from the subtraction unit 12 is outputted to the transformation/quantization unit 19. Because subsequent processes carried out after that are the same as those explained in above-mentioned Embodiment 1, the explanation of the processes will be omitted hereafter.

Next, the moving image decoding device in accordance with this Embodiment 3 will be explained. Because the moving image decoding device in accordance with this Embodiment 3 has the same structure as the moving image decoding device in accordance with any one of above-mentioned Embodiments 1 and 2, with the exception that the moving image decoding device in accordance with this Embodiment 3 has a structure different from the structure associated with the prediction image generating process having virtual pixel accuracy carried out by the motion-compensated prediction unit 70 in accordance with any one of above-mentioned Embodiments 1 and 2, and the moving image decoding device in accordance with this Embodiment 3 operates in a different way from that in accordance with any one of above-mentioned Embodiments 1 and 2 when carrying out the prediction image generating process, the structure and operation of the moving image decoding device in accordance with this Embodiment 3 will be explained by using FIGS. 1 to 16.

In accordance with any one of above-mentioned Embodiments 1 and 2, when generating a prediction image on the basis of a reference image having virtual pixel accuracy, such as half-pixel or ¼ pixel accuracy, the motion-compensated prediction unit 70 generates virtual pixels by implementing an interpolation arithmetic operation with a 6-tap filter using six integer pixels running in a vertical or horizontal direction, or the like to generate a prediction image, like in the case of the MPEG-4 AVC standards. In contrast with this, a motion-compensated prediction unit 70 in accordance with this Embodiment 3 enlarges a reference image 76 having integer pixel accuracy stored in a motion-compensated prediction frame memory 75 by carrying out a super resolution process on the reference image. As a result, the motion-compensated prediction unit generates a reference image having virtual pixel accuracy.

The motion-compensated prediction unit 70 in accordance with this Embodiment 3 generates a prediction image 72 from the reference image 76 stored in the motion-compensated prediction frame memory 75 on the basis of motion vectors included in the inputted optimum prediction parameters 63, the identification number (reference image index) of the reference image specified by each of the motion vectors, and so on, and outputs the prediction image, like that in accordance with any one of above-mentioned Embodiments 1 and 2. An adding unit 73 adds the prediction image 72 inputted from the motion-compensated prediction unit 70 to prediction difference signal decoded values 67 inputted from an inverse quantization/inverse transformation unit 66 to generate a decoded image 74.

A generation method of generating the prediction image 72 which is implemented by the motion-compensated prediction unit 70 corresponds to the operation of the motion-compensated prediction unit 9 in the encoding device from which the process of searching through a plurality of reference images for motion vectors (corresponding to the operations of the motion detecting unit 42 and the interpolated image generating unit 43 shown in FIG. 3) is excluded. The motion-compensated prediction unit carries out only the process of generating the prediction image 72 in accordance with optimum prediction parameters 63 provided thereto from a variable length decoding unit 61.

When generating a prediction image 72 at virtual pixel accuracy, the motion-compensated prediction unit 70 carries out the same process as that shown in FIG. 16 on the reference image 76 stored in the motion-compensated prediction frame memory 75 and specified by the identification number (reference image index) of the reference image to generate a reference image having virtual pixel accuracy, and then generates a prediction image 72 by using the decoded motion vector. At this time, when the encoding device has selectively determined whether or not to add the high frequency component outputted by the high frequency component estimating unit 203 shown in FIG. 16 to the enlarged image, the decoding device extracts the control information showing whether the encoding device has carries out the adding process from the bitstream 60, or uniquely determines whether the encoding device has added the high frequency component to the enlarged image from another parameter to control an adding process in the motion-compensated prediction unit 70. In the case of using another parameter to determine whether the encoding device has added the high frequency component to the enlarged image, a parameter, such as the size of the motion vector or a variation in the motion vector field in consideration of adjacent areas, can be used. The motion-compensated prediction unit 70 shares the type of the parameter with the encoding device and determines whether the encoding device has added the high frequency component to the enlarged image. As a result, the moving image encoding device does not have to multiplex the control information about the adding process directly into the bitstream 30, thereby being able to improve the compression efficiency.

The motion-compensated prediction unit 70 can carry out the process of generating a reference image having virtual pixel accuracy only when the motion vectors included in the optimum prediction parameters 18a which are outputted from the encoding device (i.e. optimum prediction parameters 63 in the decoding device) indicate the virtual pixel accuracy. In this structure, the motion-compensated prediction unit 9 switches between the use of the reference image 15 stored in the motion-compensated prediction frame memory 14, and the generation and use of a reference image 207 having virtual pixel accuracy by means of the interpolated image generating unit 43 in accordance with the motion vector, and generates a prediction image 17 from either the reference image 15 or the reference image 207 having virtual pixel accuracy.

As an alternative, the motion-compensated prediction unit can be constructed in such a way as to carry out the process shown in FIG. 16 on the reference image which is yet to be stored in the motion-compensated prediction frame memory 75 and store the reference image having virtual pixel accuracy on which the enlargement process has been carried out and in which a high frequency component has been corrected in the motion-compensated prediction frame memory 75. In the case of this structure, although the size of a memory which should be prepared as the motion-compensated prediction frame memory 75 increases, it is not necessary to duplicately carry out the process shown in FIG. 16 when the number of times that the motion vector points to a pixel at the same virtual sample position. Therefore, the amount of computation can be reduced. Further, in a case in which the range of displacement which is pointed to by the motion vector is known in advance by the decoding device, the motion-compensated prediction unit 70 can be constructed in such a way as to carry out the process shown in FIG. 16 on the target region while limiting this region only to the range. What is necessary is just to make the decoding device know the range of displacement which is pointed to by the motion vector by, for example, multiplexing a value range showing the range of displacement which is pointed to by the motion vector into the bitstream 60 to transmit the value range to the decoding device, or making both the encoding device and the decoding device mutually determine and set the value range in their operations.

As mentioned above, the moving image encoding device in accordance with Embodiment 3 is constructed in such a way that the motion-compensated prediction unit 9 has the interpolated image generating unit 43 for carrying out an enlarging process on the reference image 15 stored in the motion-compensated prediction frame memory 14, and also correcting a high frequency component to generate a reference image 207 having virtual pixel accuracy, and switches between the use of the reference image 15 or the generation and use of the reference image 207 having virtual pixel accuracy in accordance with the motion vector to generate a prediction image 17, even when carrying out high compression on the inputted video signal 1 including many high frequency components, such as fine edges, the moving image encoding device can generate the prediction image 17 which is to be generated by using a motion-compensated prediction from the reference image including many high frequency components, thereby being able to compression-encode the inputted video signal efficiently.

Further, also the moving image decoding device in accordance with Embodiment 3 is constructed in such a way that the motion-compensated prediction unit 70 has the interpolated image generating unit for generating a reference image having virtual pixel accuracy in accordance with the same procedure as that carried out by the moving image encoding device, and switches between the use of the reference image 76 stored in the motion-compensated prediction frame memory 75 or the generation and use of the reference image having virtual pixel accuracy in accordance with the motion vector multiplexed into the bitstream 60 to generate a prediction image 72, the moving image decoding device can correctly decode the bitstream encoded by the moving image encoding device in accordance with Embodiment 3.

The interpolated image generating unit 43 in accordance with above-mentioned Embodiment 3 carries out the super resolution process based on the above-mentioned technique disclosed by W. T. Freeman et al. (2000) to generate a reference image 207 having virtual pixel accuracy. However, the super resolution process is not limited the one based on the above-mentioned technique, and the interpolated image generating unit can be constructed in such a way as to use another arbitrary super resolution technique to generate a reference image 207 having virtual pixel accuracy.

Further, in a case in which the moving image encoding device in accordance with any one of above-mentioned Embodiments 1 to 3 is constructed of a computer, a moving image encoding program in which the processes carried out by the block dividing unit 2, the encoding controlling unit 3, the switching unit 6, the intra-prediction unit 8, the motion-compensated prediction unit 9, the motion-compensated prediction frame memory 14, the transformation/quantization unit 19, the inverse quantization/inverse transformation unit 22, the variable length encoding unit 23, the loop filter unit 27, and the memory 28 for intra prediction are described can be stored in a memory of the computer, and a CPU of the computer can be made to execute the moving image encoding program stored in the memory. Similarly, in a case in which the moving image decoding device in accordance with any one of above-mentioned Embodiments 1 to 3 is constructed of a computer, a moving image decoding program in which the processes carried out by the variable length decoding unit 61, the inverse quantization/inverse transformation unit 66, the switching unit 68, the intra-prediction unit 69, the motion-compensated prediction unit 70, the motion-compensated prediction frame memory 75, the memory 77 for intra prediction, and the loop filter unit 78 are described can be stored in a memory of the computer, and a CPU of the computer can be made to execute the moving image decoding program stored in the memory.

INDUSTRIAL APPLICABILITY

Because the moving image encoding device and the moving image decoding device in accordance with the present invention can switch among transformation block sizes adaptively to compression-encode an inputted moving image for each region which serves as a unit for motion-compensated prediction in each macroblock, the moving image encoding device and the moving image decoding device in accordance with the present invention are suitable for use as a moving image encoding device which divides a moving image into predetermined regions to encode the moving image on a per-region basis and as a moving image decoding device which decodes an encoded moving image on a per-predetermined-region basis.

EXPLANATIONS OF REFERENCE NUMERALS

1 inputted video signal, 2 block dividing unit, 3 encoding controlling unit, 4 macroblock size, 5 macro/subblock image, 6 switching unit, 7 encoding mode, 7a optimum encoding mode, 8 intra-prediction unit, 9 motion-compensated prediction unit, 10 prediction parameter, 10a optimum prediction parameter, 11 prediction image, 12 subtraction unit, 13 prediction difference signal, 13a optimum prediction differential signal, 14 motion-compensated prediction frame memory, 15 reference image, 17 prediction image, 18 prediction parameter, 18a optimum prediction parameter, 19 transformation/quantization unit, 20 compression parameter, 20a optimum compression parameter, 21 compressed data, 22 inverse quantization/inverse transformation unit, 23 variable length encoding unit, 24 local decoded prediction difference signal, 25 adding unit, 26 local decoded image signal, 27 loop filter unit, 28 memory for intra prediction, 29 local decoded image, 30 bitstream, 40 motion compensation region dividing unit, 41 motion compensation region block image, 42 motion detecting unit, 43 interpolated image generating unit, 44 motion vector, 45 prediction image, 50 transformation block size dividing unit, 51 transformation object block, 52 transformation unit, 53 transform coefficients, 54 quantizing unit, 60 bitstream, 61 variable length decoding unit, 62 optimum encoding mode, 63 optimum prediction parameter, 64 compressed data, 65 optimum compression parameter, 66 inverse quantization/inverse transformation unit, 67 prediction difference signal decoded value, 68 switching unit, 69 intra-prediction unit, 70 motion-compensated prediction unit, 71 prediction image, 72 prediction image, 73 adding unit, 74 and 74a decoded image, 75 motion-compensated prediction frame memory, 76 reference image, 77 memory for intra prediction, 78 loop filter unit, 79 reproduced image, 90 initializing unit, 91 context information initialization flag, 92 binarizing unit, 93 frequency information generating unit, 94 frequency information, 95 binarization table updating unit, 96 context information memory, 97 probability table memory, 98 state transition table memory, 99 context generating unit, 100 type indicating signal, 101 peripheral blocks information, 102 context identification information, 103 binary signal, 104 arithmetic encoding processing operation unit, 105 binarization table memory, 106 context information, 107 probability table number, 108 MPS probability of occurrence, 109 symbol value, 110 probability table number, 111 encoded bit sequence, 112 binarization table updating identification information, 113 binarization table update flag, 120 initializing unit, 121 context initialization information, 122 context generating unit, 123 type indicating signal, 124 peripheral blocks information, 126 context identification information, 127 arithmetic decoding processing operation unit, 128 context information memory, 129 context information, 130 probability table number, 131 probability table memory, 132 MPS probability of occurrence, 133 encoded bit sequence, 134 symbol value, 135 state transition table memory, 136 probability table number, 137 binary signal, 138 inverse binarizing unit, 139 binarization table, 140 decoded value, 141 binarization table updating unit, 142 binarization table update flag, 143 binarization table memory, 144 binarization table updating identification information, 200 image reduction processing unit, 201a and 201b high frequency feature extracting unit, 202 correlation calculating unit, 203 high frequency component estimating unit, 204 high frequency component pattern memory, 205 image enlarging process unit, 206 adding unit, 207 reference image having virtual pixel accuracy.

The invention claimed is:

1. A moving image decoding device which decodes a bit stream generated by dividing an image of a moving image into a plurality of blocks and by compression-encoding the blocks and obtains the moving image, the moving image decoding device comprising:
   a motion-compensated predictor to generate an inter prediction image of one of the blocks on a basis of encoding mode information which indicates a sub-block assignment for inter prediction processing on the block; and
   a variable-length decoder to entropy-decode the bit stream in order to obtain a binary string and obtain the encoding mode information from the binary string,
   wherein the variable-length decoder obtains an identifier from the bit stream, the identifier specifying a table from a plurality of binarization tables each of which defines a binary string assignment to the encoding mode information, and obtains the encoding mode information by inverse binarizing the binary string in accordance with the specified binarization table.

2. A moving image decoding method of decoding a bit stream generated by dividing an image of a moving image into a plurality of blocks and by compression-encoding the blocks and obtains the moving image, the moving image decoding method comprising:
   obtaining a binary string by entropy-decoding the bit stream;
   obtaining encoding mode information by inverse binarizing the binary string in accordance with a binarization table which is specified from a plurality of binarization tables each of which defines a binary string assignment to the encoding mode information, the identifier being obtained from the bit stream; and
   generating an inter prediction image of one of the blocks on a basis of the encoding mode information, the encoding mode information indicating a sub-block assignment for inter prediction processing on the block.

3. A moving image encoding device which generates a bit stream by dividing an image of a moving image into a plurality of blocks and by compression-encoding the blocks, the moving image encoding device comprising:
   a motion-compensated predictor to generate an inter prediction image of one of the blocks on a basis of encoding mode information which indicates a sub-block assignment for inter prediction processing on the block; and
   a variable-length encoder to binarize the encoding mode information to a binary string and entropy-encode the binary string into the bit stream,
   wherein the variable-length eneoder carries out the binarization according to a binarization table specified with an identifier from a plurality of binarization tables, each of which defines a binary string assignment to the encoding mode information, and encodes the identifier into the bit stream.

4. A moving image encoding method of generating a bit stream by dividing an image of a moving image into a plurality of blocks and by compression-encoding the blocks, the moving image encoding method comprising:
   generating an inter prediction image of one of the blocks on a basis of encoding mode information which indicates a sub-block assignment for inter prediction processing on the block;
   binarizing the encoding mode information to a binary string in accordance with a binarization table which is specified with an identifier from a plurality of binarization tables each of which defines a binary string assignment to the encoding mode information, the identifier being encoded into the bit stream; and
   entropy-encoding the binary string into the bit stream.

5. A non-transitory computer-readable medium storing a bit stream which is generated by dividing an image of a moving image into a plurality of blocks and by compression-encoding the blocks, the bit stream comprising:
   a prediction difference generated by subtracting a prediction image of one of the blocks from the block, the prediction image being generated on a basis of encoding mode information which indicates a sub-block assignment for inter prediction processing on the block;
   an identifier specifying one of a plurality of binarization tables each of which defines a binary string assignment to the encoding mode information; and
   a binary string encoded with entropy-coding, the binary string being obtained by binarizing the encoding mode information in accordance with the binarization table specified by the identifier.

* * * * *

UNITED STATES PATENT AND TRADEMARK OFFICE
CERTIFICATE OF CORRECTION

| | |
|---|---|
| PATENT NO. | : 9,973,753 B2 |
| APPLICATION NO. | : 15/443431 |
| DATED | : May 15, 2018 |
| INVENTOR(S) | : Yoshimi Moriya et al. |

It is certified that error appears in the above-identified patent and that said Letters Patent is hereby corrected as shown below:

In the Claims

In Claim 3, at Column 42, Line 19:
Please correct "eneoder" to -- encoder --

Signed and Sealed this
Twenty-first Day of April, 2020

Andrei Iancu
*Director of the United States Patent and Trademark Office*